US009900104B2

(12) United States Patent
McNicol et al.

(10) Patent No.: US 9,900,104 B2
(45) Date of Patent: Feb. 20, 2018

(54) MULTIPLEXER AND MODULATION ARRANGEMENTS FOR MULTI-CARRIER OPTICAL MODEMS

(75) Inventors: John D. McNicol, Ottawa (CA); Kuang-Tsan Wu, Kanata (CA); Han Henry Sun, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 343 days.

(21) Appl. No.: 13/078,893

(22) Filed: Apr. 1, 2011

(65) Prior Publication Data

US 2012/0251120 A1 Oct. 4, 2012

(51) Int. Cl.

| | |
|---|---|
| ***H04J 14/02*** | (2006.01) |
| ***H04B 10/50*** | (2013.01) |
| ***H04B 10/67*** | (2013.01) |
| ***H04B 10/516*** | (2013.01) |
| *H04J 14/06* | (2006.01) |

(52) U.S. Cl.

CPC ....... *H04B 10/506* (2013.01); *H04B 10/5161* (2013.01); *H04B 10/675* (2013.01); *H04J 14/0256* (2013.01); *H04J 14/026* (2013.01); *H04J 14/0212* (2013.01); *H04J 14/0213* (2013.01); *H04J 14/06* (2013.01)

(58) Field of Classification Search

CPC ........................................................ H04J 14/02

USPC .......................................................... 398/183

See application file for complete search history.

(56) References Cited

U.S. PATENT DOCUMENTS

| | | | |
|---|---|---|---|
| 6,614,567 B1 * | 9/2003 | Al-Salameh et al. | .......... 398/79 |
| 7,424,041 B2 * | 9/2008 | Meliga et al. | .................. 372/20 |
| 7,693,429 B1 * | 4/2010 | Lowery | ................ H04B 10/548 398/182 |

(Continued)

FOREIGN PATENT DOCUMENTS

| | | | |
|---|---|---|---|
| WO | WO2010/100763 A1 * | 9/2010 | ............. H04B 10/00 |
| WO | WO2011/030897 * | 3/2011 | .............. H04J 14/06 |

*Primary Examiner* — Shi K Li

(74) *Attorney, Agent, or Firm* — David L. Soltz

(57) ABSTRACT

Consistent with the present disclosure, data, in digital form, is received by a transmit node of an optical communication system, and converted to an analog signal by a digital-to-analog converter (DAC) to drive a modulator. The modulator, in turn, modulates light at one of a plurality of wavelengths in accordance with the received data forming a plurality of corresponding carriers. The carriers are modulated according to one of a plurality of modulation formats and then optically combined to form a superchannel of a constant maximum capacity, for example. Accordingly, the number of carriers and the bit rate for each carrier remain constant for each modulation format to realize a constant maximum capacity. The superchannel is then transmitted over an optical communication path to a receive node. At the receive node, the superchannel is optically demultiplexed from a plurality of other superchannels. The plurality of carriers of the superchannel are then supplied to a photodetector circuit, which receives additional light at one of the optical signal carrier wavelengths from a local oscillator laser. An analog-to-digital converter (ADC) is provided in the receive node to convert the electrical signals output from the photodetector into digital form. The output from the ADC is then filtered in the electrical domain, such that optical demultiplexing of the carriers is unnecessary.

12 Claims, 16 Drawing Sheets

(56) References Cited

U.S. PATENT DOCUMENTS

| | | | | |
|---|---|---|---|---|
| 7,796,897 | B2 * | 9/2010 | Nakamoto | 398/185 |
| 8,180,227 | B2 * | 5/2012 | Liu et al. | 398/203 |
| 2009/0202196 | A1 * | 8/2009 | Kish et al. | 385/14 |
| 2009/0214212 | A1 * | 8/2009 | Vorbeck et al. | 398/79 |
| 2010/0310256 | A1 * | 12/2010 | Shpantzer et al. | 398/74 |
| 2011/0236031 | A1 * | 9/2011 | Itou | 398/141 |
| 2011/0305457 | A1 * | 12/2011 | Kikuchi | H04B 10/5055<br>398/65 |
| 2012/0224851 | A1 * | 9/2012 | Takara et al. | 398/45 |

* cited by examiner

100

MULTIPLEXER AND MODULATION ARRANGEMENTS FOR MULTI-CARRIER OPTICAL MODEMS

BACKGROUND OF THE DISCLOSURE

Wavelength division multiplexed (WDM) optical communication systems are known in which multiple optical signals or channels, each having a different wavelength, are combined onto an optical fiber. Such systems typically include a laser associated with each wavelength, a modulator configured to modulate the optical signal output from the laser, and an optical combiner to combine each of the modulated optical signals. Such components are typically provided at a transmit end of the WDM optical communication system to transmit the optical signals onto the optical fiber. At a receive end of the WDM optical communication system, the optical signals are often separated and converted to corresponding electrical signals that are then processed further.

Known WDM optical communication systems are capable of multiplexing 40 channels at 100 GHz spacing or 80 channels at 50 GHz spacing. These WDM optical communication systems occupy an overall bandwidth of 4000 GHz. At 50 GHz channel spacing and 100 GHz channel spacing, the occupied optical fiber bandwidth or spectrum is not efficiently used. As rapid growth of the Internet continues, and new applications arise, there is an increasing demand for higher data rates provided by underlying networks, which may be supported by advances in optical communication systems. Due to the increased demand, the information carrying capacity of an optical fiber preferably should also increase. As used herein, the terms “carrier”, “channel”, and “optical signal” may be used interchangeably.

One method to increase the data capacity of the occupied optical fiber bandwidth is to employ higher data rate modulation formats to modulate the optical signals or channels to carry data at higher rates. Such higher rate modulation formats, however, are typically more susceptible to noise, and, therefore, may not be used in transmission of optical signals over relatively long distances. Thus, the modulation format must be chosen according to a desired reach, or distance, the transmitted channels are expected to span. Other known systems, commonly called dense wavelength-division multiplexing systems (DWDM), are capable of increasing the total data capacity by packing even more densely, additional channels on an optical fiber by more closely spacing the channels together, such as at 25 GHz spacing between channels. While 25 GHz channel spacing is an improvement over 50 GHz and 100 GHz spacing, further improvement is still needed to meet the demands of increased data rates. However, the dense packing of individual channels at a reduced spectral spacing between channels has lead to challenges in reliably separating the individual channels at a receive end and increases error rates for the channel due to cross-talk between the adjacent channels or cross-phase modulation effects, for example. Thus, there is a tradeoff between optical communication system performance and the number of channels to be transmitted per fiber and their spectral spacing, as well as the modulation performed on each of the channels. Accordingly, for a specific embodiment, a maximum capacity can be achieved by optimizing the above parameters, such as the chosen modulation format for the optical signal, the span of the signal and the channel spacing between adjacent signals.

Preferably, the information carrying capacity of an optical communication system should be optimized to carry a maximum amount of data over a maximum length of optical fiber. For example, individual carrier or channel spectral spacing should be minimized according to the available technology capable of reliably transmitting and receiving such minimally spaced channels. Therefore, a greater number of channels can be packed in a given spectral bandwidth, resulting in more efficient use of network resources and the occupied optical spectrum of the channels. Additionally, when selecting the parameters and their respective values for optimizing the optical communication system capacity, the underlying network architecture should be considered as well as the data demands of the customer.

Accordingly, increased data demands of the network drive a need to provide a plurality of minimally spaced carriers to increase optical communication system network capacity. Additionally, unique customer requirements provide a need to flexibly group the plurality of minimally spaced carriers together in blocks or “superchannels” that can be individually routed throughout the network and that can be multiplexed with other blocks of similar minimally spaced carriers. Some known systems include routers or multiplexers with limited data capacity throughput. Thus, while optimum capacity of the optical communication system is generally desired, it is also preferred that the system capacity at any network component is not exceeded. Thus, it may be advantageous to limit the maximum data capacity available on each superchannel. In such cases when the data capacity is limited, it is preferred that the occupied bandwidth of the superchannel is minimized to obtain maximum spectral efficiency of the occupied bandwidth of an optical communication system.

SUMMARY OF THE DISCLOSURE

Consistent with one aspect of the present disclosure, an apparatus is provided comprising an optical transmitter configured to selectively supply either a first plurality of optical signals or a second plurality of optical signals, each of the first plurality of optical signals being modulated in accordance with a first modulation format, and each of the second plurality of optical signals being modulated in accordance with a second modulation format. Collectively, the first plurality of optical signals have an associated data rate and collectively, the second plurality of optical signals have the same associated data rate. An optical combiner is also provided that is configured to receive the first plurality of optical signals and the second plurality of optical signals, the optical combiner combining either the first plurality of optical signals or the second plurality of optical signals and supplying either the first plurality of optical signals or the second plurality of optical signals to an optical communication path.

Consistent with another aspect of the present disclosure, a method selectively generates one or more of a first plurality of optical signals and a second plurality of optical signals, said first and second plurality of optical signals not being generated simultaneously, said first and second pluralities of optical signals being modulated in accordance with first and second modulation formats, respectively, and both of said first and second pluralities of optical signals having substantially identical data rates. The generated one or more pluralities of first and second optical signals are then received and combined. The combined one or more pluralities of first and second optical signals are then supplied to an optical communication path.

Consistent with another aspect of the present disclosure, a method generates a first plurality of optical signals, each of the first plurality of optical signals being modulated in accordance with a first modulation format, the first plurality of optical signals collectively having an associated data rate, and each of the first plurality of optical signals carrying a first plurality of symbols at a first symbol rate. The first plurality of optical signals are combined as a first superchannel. A second plurality of optical signals are generated, each of the second plurality of optical signals being modulated in accordance with a second modulation format, the second plurality of optical signals collectively having the associated data rate, and each of the second plurality of optical signals carrying a second plurality of symbols at a second symbol rate, wherein a number of the first plurality of optical signals is equal to a number of the second plurality of optical signals. The second plurality of optical signals are combined as a second superchannel. The first and second superchannel are multiplexed and supplied to an optical communication path.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION OF THE EMBODIMENTS

Figure 1A:
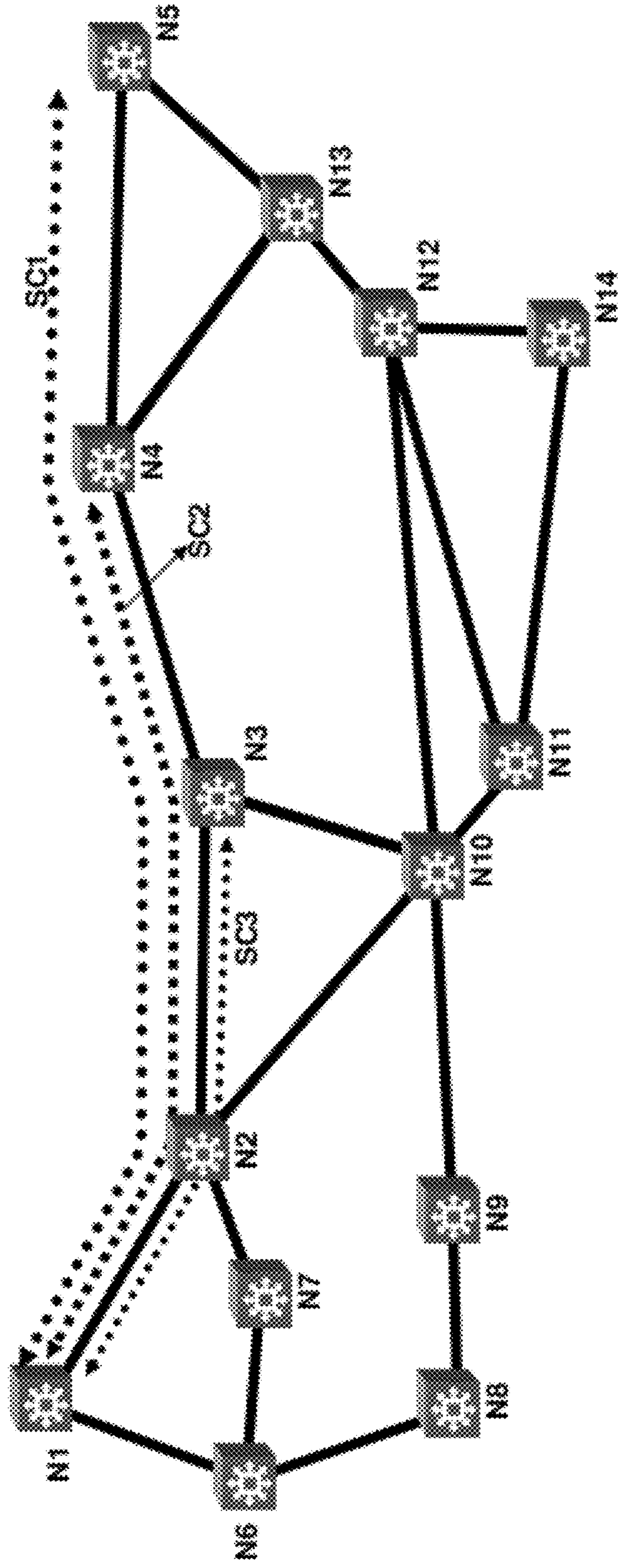
FIG. 1*a* illustrates an optical communication system consistent with aspects of the present disclosure.

Consistent with the present disclosure, data, in digital form, is received by a transmit node of an optical communication system, and converted to an analog signal by a digital-to-analog converter (DAC) to drive a modulator. The modulator, in turn, modulates light at one of a plurality of minimally spaced wavelengths in accordance with the received data and a specified modulation format. The plurality of minimally spaced wavelengths or carriers are grouped together with a multiplexer or combiner, for example, to form a superchannel. A plurality of superchannels are then multiplexed and transmitted over an optical communication path to a receive node. At the receive node, the multiplexed superchannels are demultiplexed by an optical demultiplexer and provided to a plurality of corresponding demodulators. The demultiplexed superchannels, or carriers, may then be intradyned in a known manner by combining them with light from a plurality of local oscillators tuned to each of the minimally spaced wavelengths to provide a baseband optical signal for each carrier. The baseband optical signals are supplied to corresponding photodetectors, which, in turn, supply analog electrical signals (representative of a known "down-converted" signal), that may be amplified or otherwise processed, and provided to an analog-to-digital converter (ADC). The ADC converts the processed analog electrical signals into digital form. The output from the ADC is then further processed to generate a copy of the data supplied to the transmit node.

In particular, such processing may include filtering electrical signals generated in response to the ADC outputs in order to select data associated with one of the plurality of modulated optical signals or carriers. The exemplary detection methods enable reliable electrical filtering of the baseband optical signal for each of the individual carriers. Since filtering is carried out electronically, i.e., in the electrical domain, instead of optically, fixed optical demultiplexers are not required to demultiplex the minimally spaced carriers. Moreover, the bandwidth of the carriers may vary for each superchannel. Thus, the electrical filtering of the optical carriers may be readily tuned by circuitry in the transmit and receive nodes, such that the optical signals carrying such data may be spectrally spaced closer to one another.

Because it is desired to send data over widely varying distances, the reach requirements for each superchannel may vary. Thus, for each superchannel, it is advantageous to enable the use of a plurality of modulation formats optimized for the varying distances using a single hardware implementation at a transmitter and receiver. Further, an efficient network preferably enables flexible routing, switching and interconnection of a plurality of superchannels throughout the network according to desired performance. Because an optical communication system according to an aspect of this disclosure may have a limited interconnect capacity at a node in the system, it is desired that each superchannel carry a fixed maximum data capacity, for example, to ensure that that the interconnect capacity at any given time is not exceeded by the total capacity of the plurality of interconnected superchannels. Additionally, to simplify hardware implementation of a transmit node in the network, the number of carriers and the bit rate for each of the carriers in each superchannel is preferably constant with respect to the varying modulation format. Thus, in accordance with one embodiment, each carrier or optical signal is modulated in accordance with a selected modulation format, such that the baud rate or symbol rate for each optical signal or carrier may vary in order to provide a constant maximum capacity data rate or collective data rate, for example, for each superchannel. Thus, the number of optical signals or carriers, the modulation format of each optical signal, and the baud or symbol rate of each optical signal is selected so that that collectively, the overall data rate of the superchannel remains substantially fixed. For example, for a given number of optical signals modulated with a particular modulation format, a particular symbol rate for each carrier may be selected to provide a collective data rate for the superchannel, and for the same given number of optical signals modulated with a different modulation format, a different symbol rate may alternatively be provided to provide the same collective data rate for the superchannel. As a result, the same overall superchannel data rate may be provided, such that uniform units of data can be processed or switched regardless of system parameters, such as dispersion, loss, non-linear effects or other parameters that may affect optical signal data rates.

Thus, consistent with the present disclosure, in order to satisfy both network and customer demands, each superchannel can support a range of modulation formats for a predetermined number of carriers optimally selected for desired performance. In order to maintain a constant capacity of the superchannel, the baud rate or symbol rate for each of the carriers in the super channel varies according to the modulation format. Therefore, the occupied optical bandwidth of each superchannel can vary efficiently with the selected modulation format, thus, minimizing the occupied spectral bandwidth of each superchannel. Accordingly, an efficient carrier plan in each superchannel can provide a constant data rate or data capacity that is optimized for system economy and customer needs while maximizing spectral efficiency.

Reference will now be made in detail to the present exemplary embodiments of the present disclosure, which are illustrated in the accompanying drawings. Wherever possible, the same reference numbers will be used throughout the drawings to refer to the same or like parts.

An optical communication system 100 is shown in FIG. 1*a*. As shown, the optical communication system 100 comprises a plurality of interconnected nodes N1 to N14 that may span across the United States, for example. Each node, e.g., N1 to N14, may enable high capacity WDM optical transport and digital add/drop flexibility for multiplexing a plurality of optical signals traversing the optical communication system 100. Optical signals are preferably grouped according to a plurality of superchannels, SC1, SC2 and SC3, for example. Each node N1 to N14 preferably uses the exemplary systems and methods discussed below to transmit and receive superchannels, SC1, SC2, and SC3, in the optical communication system 100. The exemplary systems and methods discussed below enable nodes N1 to N14 to convert optical signals received from interconnected nodes to the electrical domain for processing and then convert the electrical signals back into optical signals for forwarding to other interconnected nodes. Thus, key network functions in each node N1 to N14 are enabled by electronic components and processes, not complex optical components. Accordingly, the optical bandwidth attendant with a node can, therefore, be easily and effectively managed to maximize service flexibility, enable rapid network reconfigurability and simplify network engineering and operations. The exemplary optical communication system 100 can be implemented by deploying nodes, N1 to N14, anywhere in the network where access is desired. Some nodes may even be implemented, such as shown with respect to node N2 in FIG. 1*a*, to simply route or pass one or more superchannels, SC1, SC2 and SC3, to other nodes in the network without processing the data that is carried by the superchannels. Some exemplary systems and methods implemented in nodes, N1 to N14, are further discussed below.

Figure 1B:
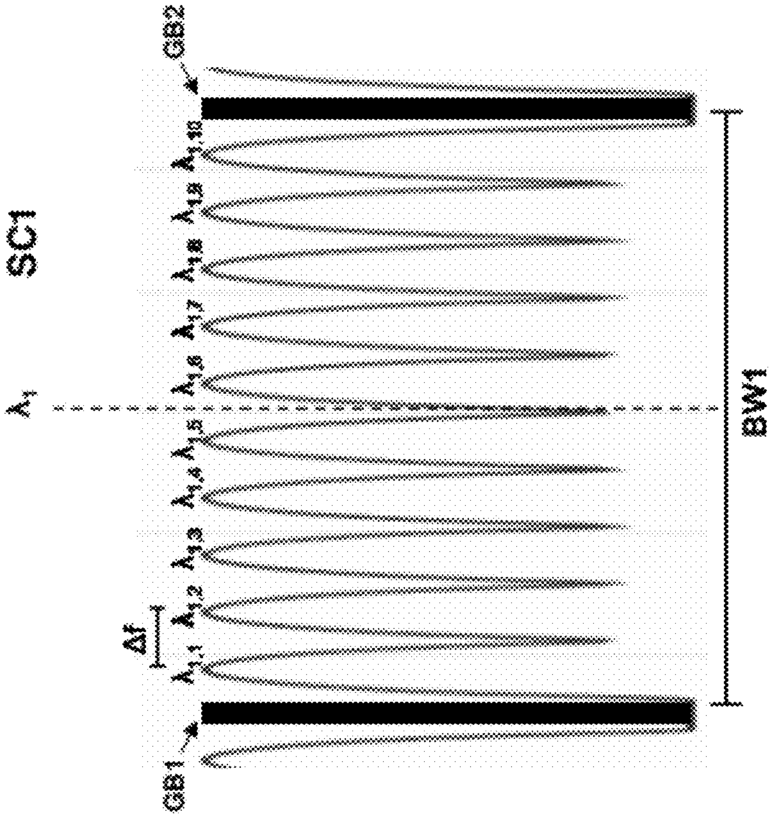
FIG. 1*b* illustrates an optical signal or superchannel transmitted in an optical communication system consistent with aspects of the present disclosure.
Figure 2A:
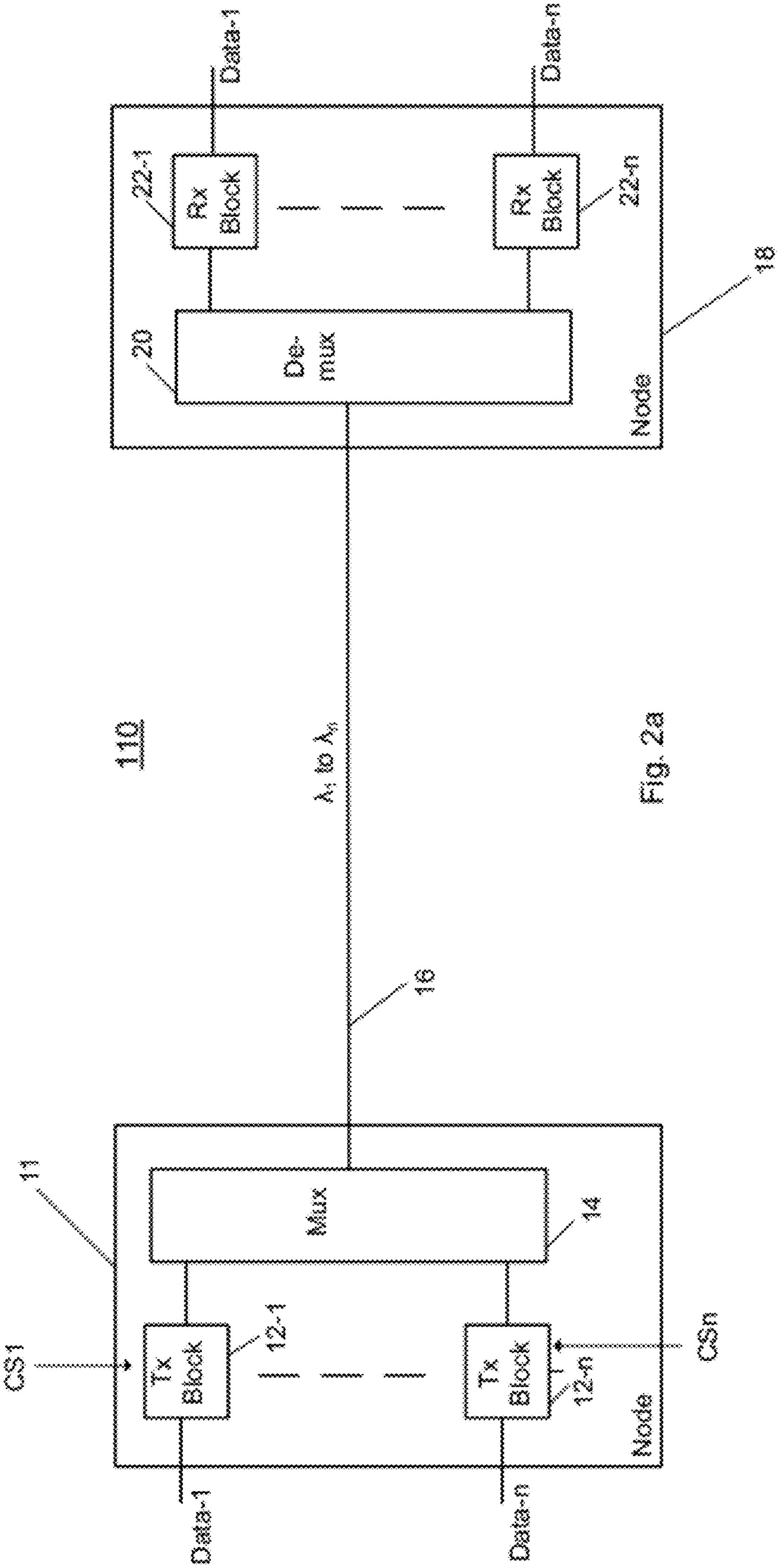
FIGS. 2*a*, 2*b* and 2*c* illustrate an optical link consistent with aspects of the present disclosure.

FIG. 2*a* illustrates an optical link 110 provided between a transmit node 11 and a receive node 18, such as between nodes N1 and N3, for example, as part of an optical communication system 100 consistent with an aspect of the present disclosure. Transmit node 11 (N1 in this example) may include a plurality of transmitter blocks (Tx Block) 12-1 to 12-*n*. The same or similar transmitter blocks may also be provided in any of remaining nodes N2 to N14. Each of transmitter blocks 12-1 to 12-*n* receives a corresponding one of a plurality of data or information streams, Data-1 to Data-n, and, in response to a respective one of these data streams, each of transmitter blocks 12-1 to 12-*n* outputs a group or band of optical signals or carriers to a combiner or multiplexer 14. Accordingly, in the exemplary embodiment, each transmitter block 12-1 to 12-*n* outputs a superchannel comprising a band of a plurality of sub-wavelength channels or optical carriers, as shown in FIG. 1*b*. Each superchannel carries an information stream or data corresponding to each of data streams Data-1 to Data-n, respectively.

The optical signals or carriers included in each group or band are centered around a wavelength specified by the International Telecommunications Union (ITU) standard. Alternatively, the band of optical signals or carriers are flexibly centered around a wavelength that optimizes an occupied spectral bandwidth of the plurality of superchannels transmitted in the optical communication system 100. As shown in FIG. 1*b*, a plurality of optical signals or carriers λ1,1 to λ1,10 are grouped or banded together to form a superchannel SC1. Each carrier λ1,1 to λ1,10 of SC1 may be considered a sub-wavelength channel banded around the center wavelength λ1 identifying the superchannel SC1. As shown, in an exemplary embodiment, the plurality of sub-wavelength channels λ1,1 to λ1,10 are very closely or minimally spaced so as to optimize the occupied bandwidth BW1 of the superchannel SC1. In one embodiment, the plurality of carriers are spaced apart by a constant or fixed spacing. In other words, as shown in FIG. 1*b*, a corresponding frequency spacing between the center wavelengths λ1,1 and λ1,2, shown as Δf, is the same for each of the other carriers in the superchannel. Thus, each of the carriers are said to have a periodic or fixed spacing from each other by Δf. According to one embodiment, a plurality of carriers of each other superchannel may have a different fixed spacing according to the specific embodiment.

Multiplexer 14, which in accordance with this embodiment includes one or more optical filters or broadband combiners, for example, combines each of the groups of optical signals or superchannels onto optical communication path 16, regardless of wavelength. The multiplexer 14 preferably combines the superchannels together with a spectral spacing or guard band (GB1 and GB2 shown in FIG. 1*b*) between the adjacent superchannels that enables reliable demultiplexing of the combined superchannels at a receive node 18 using an optical demultiplexer 20. Receive node 18 is preferably provided in any of nodes N1 to N14 interconnected with a corresponding node comprising the transmit node 11, such as node N3 in this example. Optical communication path 16 includes one or more segments of optical fiber and optical amplifiers, for example, to optically amplify or boost the power of the transmitted optical signals.

Figure 2B:
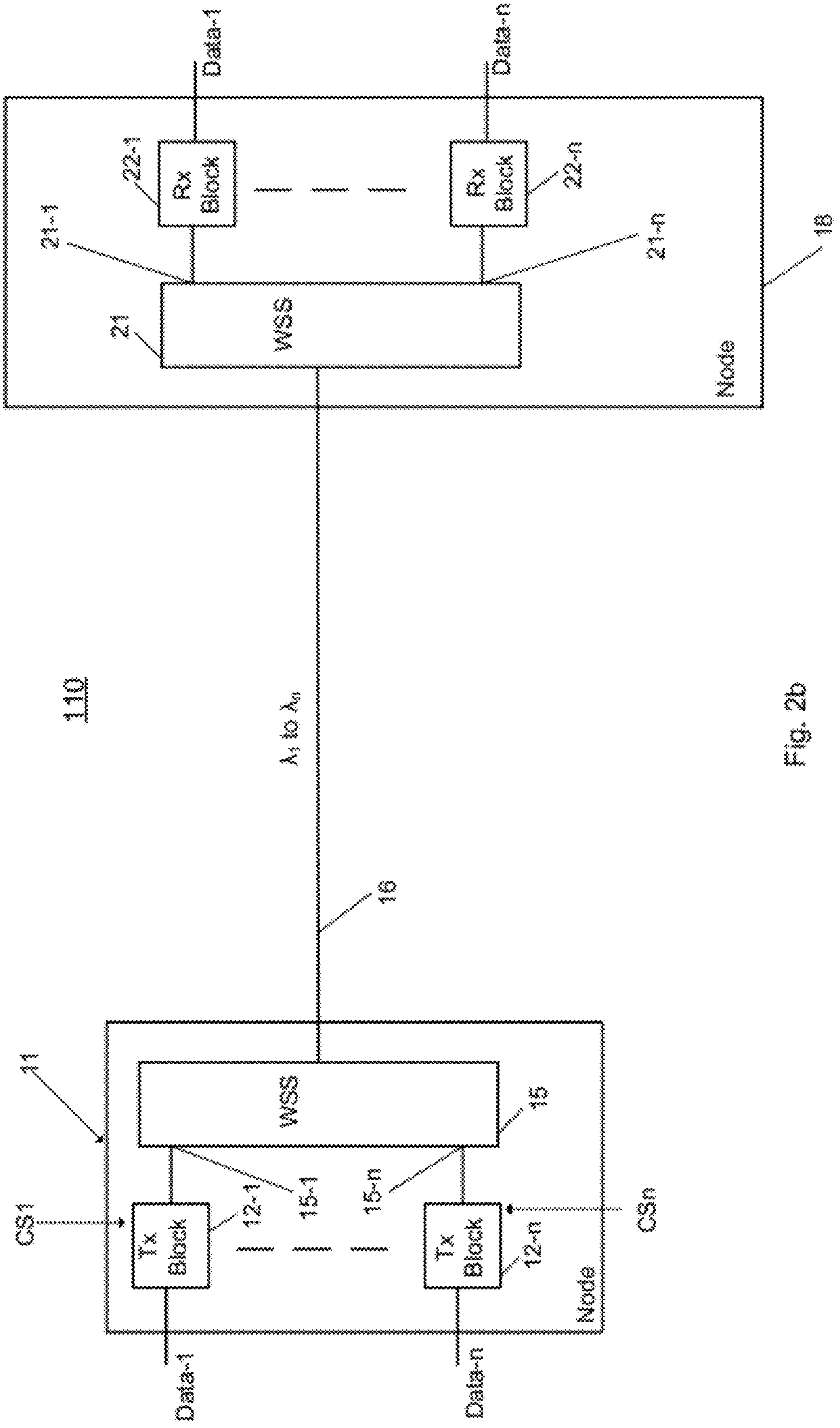

In some embodiments, demultiplexer 20 may be substituted with a wavelength selective switch (WSS) 21, as shown in FIG. 2*b*. As generally understood, and depending on system requirements, WSS 21 may be configured to output from a first port 21-1, a first superchannel from path 16 having a wavelength within a first range or optical bandwidth and output a second superchannel with a wavelength within a second range from a second port 21-*n*. Consistent with the present disclosure, additional optical signals or superchannels having associated bandwidths are supplied from either one or both ports 21-1 and 21-*n* in order to maximize the number of optical signals or superchannels supplied from each port. WSS 21 is preferably used in a network node, N2 for example, for routing one or more superchannels between nodes N1 and N3. WSS 21 may also be used for multiplexing, adding or dropping one or more superchannels from other nodes, for example. According to some embodiments, a WSS 15 may also be substituted for the multiplexer 14 shown in FIG. 2*a*. WSS 15 is configured to receive at a first port 15-1 a first superchannel having a wavelength within a first range or optical bandwidth and combine it with a second superchannel having a wavelength within a second range received at a second port 15-*n*. The combined superchannels may then be output onto path 16.

As further shown in FIG. 2*a*, a receive node 18 (node N3 in this example) is provided that includes an optical decombiner or demultiplexer 20, which may include one or more optical filters, for example. Optical demultiplexer 20 supplies each superchannel or group of received optical signals to a corresponding one of receiver blocks (Rx Blocks) 22-1 to 22-*n*. Each of receiver blocks 22-1 to 22-*n*, in turn, supplies a corresponding copy of data or information streams Data-1 to Data-n in response to the optical signals. It is understood that each of transmitter blocks 12-1 to 12-*n* has the same or similar structure and each of receiver blocks 22-1 to 22-*n* has the same or similar structure.

Figure 2C:
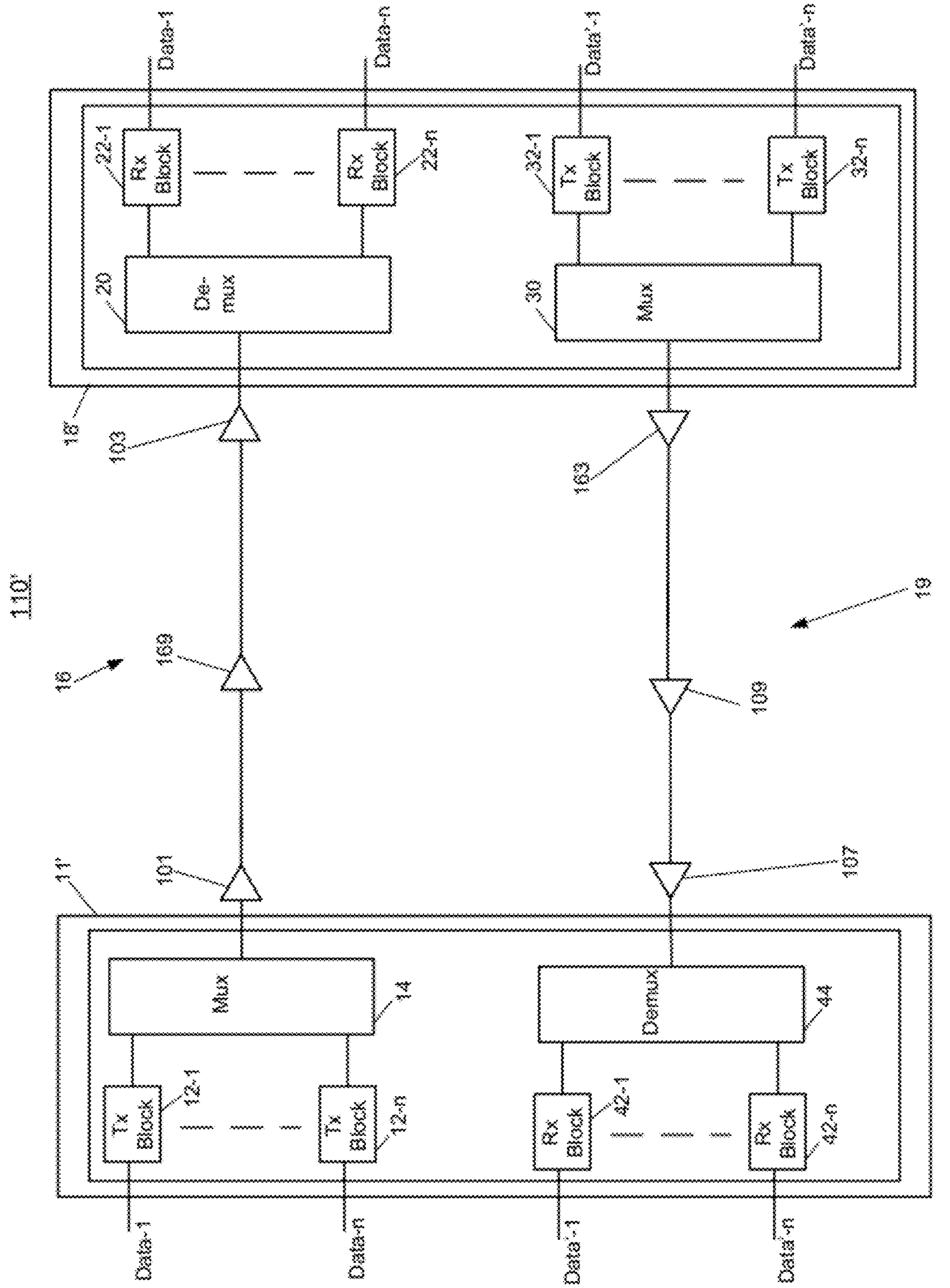

As shown in FIG. 1*a*, each node N1 to N14 may be interconnected with a plurality of other nodes in the optical communication system 100. Accordingly, some of nodes N1 to N14 may be configured to both transmit and receive optical signals or superchannels, SC1, SC2, and SC3, from other nodes in the optical communication system 100. FIG. 2*c* illustrates another exemplary embodiment of an optical link 110' consistent with the present disclosure in which a node includes both transmitter blocks and receiver blocks.

As shown in FIG. 2*c*, communication system 110' includes a first rack, cabinet, chassis, or housing 11', which includes a plurality of transmitter blocks (Tx Block) 12-1 to 12-*n*, and a plurality of receiver blocks (Rx Block) 42-1 to 42-*n*. Similar to the above, each of the transmitter blocks 12-1 to 12-*n* receives a corresponding one of a plurality of data or information streams Data-1 to Data-n, and, in response to a respective one of these data streams, each of transmitter blocks 12-1 to 12-*n* may output a group of optical signals or a superchannel to a combiner or multiplexer 14, which multiplexes a plurality of superchannels together onto optical communication path 16. As shown, optical communication path 16 may include one or more segments of optical fiber and optical amplifiers 101, 169, and 103, for example, to optically amplify or boost the power of the transmitted optical signals.

As further shown in FIG. 2*c*, the communication system 110' includes a second rack, cabinet, chassis, or housing 18', which includes a plurality of receiver blocks 22-1 to 22-*n* and a plurality of transmitter blocks 32-1 and 32-*n*. An optical combiner or demultiplexer 20 may include one or more optical filters, for example, and supply each group of received optical signals to a corresponding one of receiver blocks (Rx Blocks) 22-1 to 22-*n*. Each of receiver blocks 22-1 to 22-*n*, in turn, supplies a corresponding copy of data or information streams Data-1 to Data-n in response to the optical signals. Transmitter blocks 32-1 to 32-*n* and multiplexer 30 function similarly as transmitter blocks 12-1 to 12-*n* and multiplexer 14 provided in housing 11' in order to provide bi-directional communication via a communication path 19 between interconnected nodes N1 to N14 shown in FIG. 1*a*. Accordingly, receiver blocks 42-1 to 42-*n* and demultiplexer 44 also function similarly as receiver blocks 22-1 to 22-*n* and demultiplexer 20, respectively. As shown, optical communication path 19 also may include one or more segments of optical fiber and optical amplifiers 163, 109 and 107, for example, to optically amplify or boost the power of the transmitted optical signals. As shown in FIG. 2*b*, multiplexers 14, 30 and demultiplexers 20, 44 may be substituted with programmable WSSs 15 and 21, respectively.

Figure 3A:
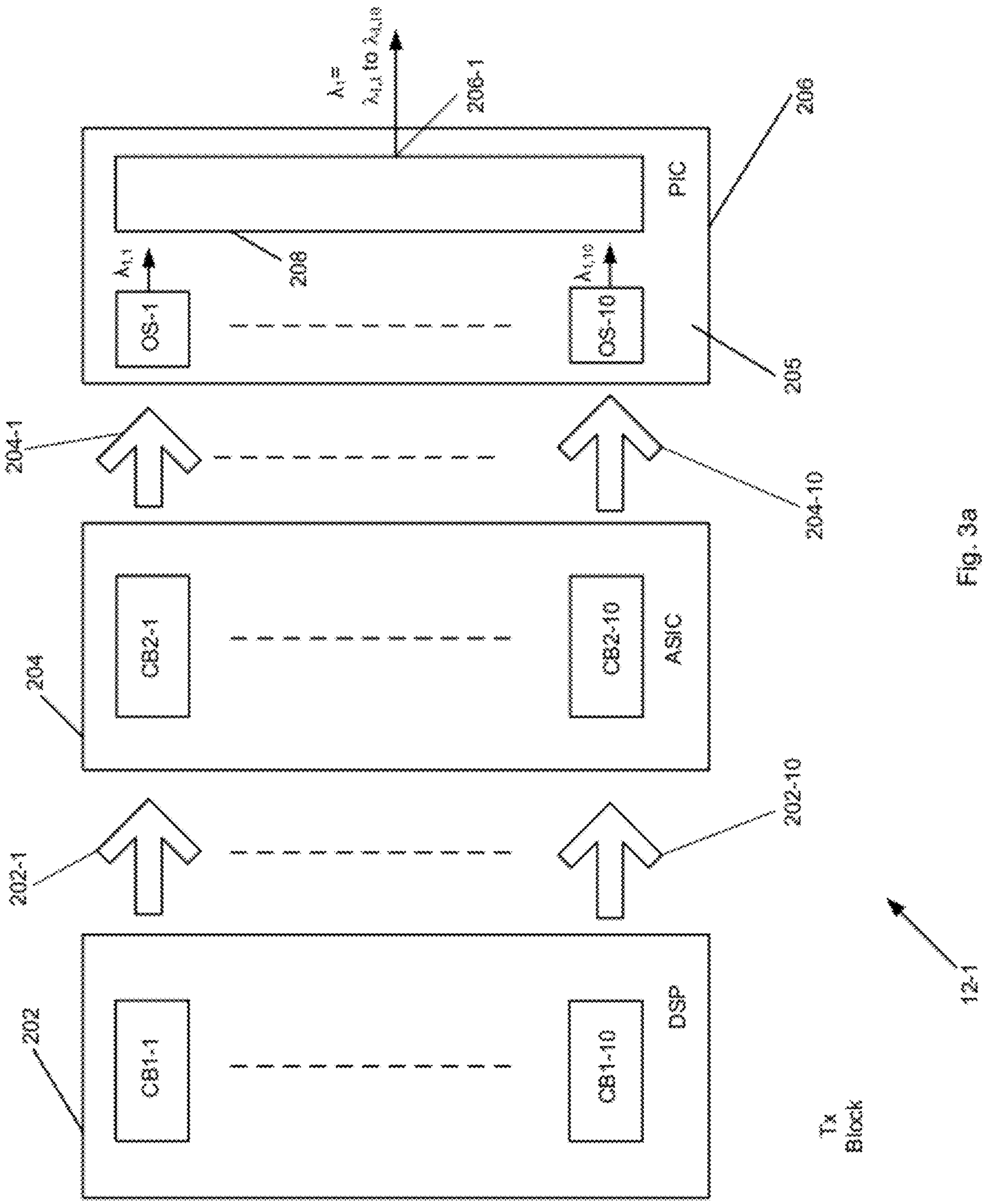
FIGS. 3*a* and 3*b* illustrate various portions of a transmitter block consistent with an additional aspect of the present disclosure.

FIG. 3*a* illustrates one of transmitter blocks 12-1 in greater detail. Transmitter block 12-1 may include a digital signal processor (DSP) including circuitry or circuit blocks CB1-1 to CB1-10, each of which is configured for receiving, for example, a corresponding portion of Data-1 and supplying a corresponding one of outputs or electrical signals to 202-1 to 202-10 to a circuit, such as application specific integrated circuit (ASIC) 204. ASIC 204 includes circuit blocks CB2-1 to CB2-10, which supply corresponding outputs or electrical signals 204-1 to 204-10 to optical sources OS-1 to OS-10 provided on a transmit photonic integrated circuit (PIC) 206. Optical sources OS-1 to OS-10 and multiplexer 208 may be provided on substrate 205, for example. Substrate 205 may include indium phosphide or other semiconductor materials. Moreover, it is understood, that optical sources OS-1 to OS-10, as well as multiplexer 208, may be provided as discrete components, as opposed to being integrated onto substrate 205 as PIC 206. Alternatively, selected components may be provided on a first substrate while others may be provided on one or more additional substrates in a hybrid scheme in which the components are neither integrated onto one substrate nor provided as discrete devices.

As further shown in FIG. 3*a*, each of optical sources OS-1 to OS-10 supplies a corresponding one of modulated sub-wavelength optical signals or carriers having wavelengths λ1,1 to λ1,10, respectively. As discussed further below with respect to FIG. 5, in one embodiment, the modulated sub-wavelength optical signals output from OS-1 to OS-10 may be polarization multiplexed. The polarization multiplexed optical signals may then be combined by a multiplexer or combiner 208, such as a broadband combiner, for example, into a band or group of optical signals comprising a superchannel represented by λ1 supplied by output 206-1, see also FIG. 1*b*. An optical broadband combiner 208 is preferably used in the exemplary embodiments, because, as further described below, the baud rate and therefore spectral bandwidth of the plurality of carriers λ1,1 to λ1,10 varies according to a modulation format utilized for the carriers. Because PIC 206 in the exemplary embodiments preferably supports a plurality of modulation formats, a broadband combiner 208 is utilized to combine the plurality of carriers for each of the modulation formats. If the baud rate or spectral bandwidth of the plurality of carriers λ1,1 to λ1,10 is constant for each modulation format, a filter based multiplexer, such as a known arrayed waveguide grating AWG, can be substituted for the broadband combiner 208.

Although FIG. 3*a* illustrates ten circuit blocks CB1-1 to CB1-10, ten circuit blocks CB2-1 to CB2-10, and ten optical sources OS-1 to OS-10, it is understood that any appropriate number of such circuit blocks and optical sources may be provided. For example, the appropriate number of circuit blocks is determined according to the number of sub-wavelength carriers utilized in accordance with a selected modulation format for each carrier of the superchannel, as will be discussed further below.

Figure 3B:
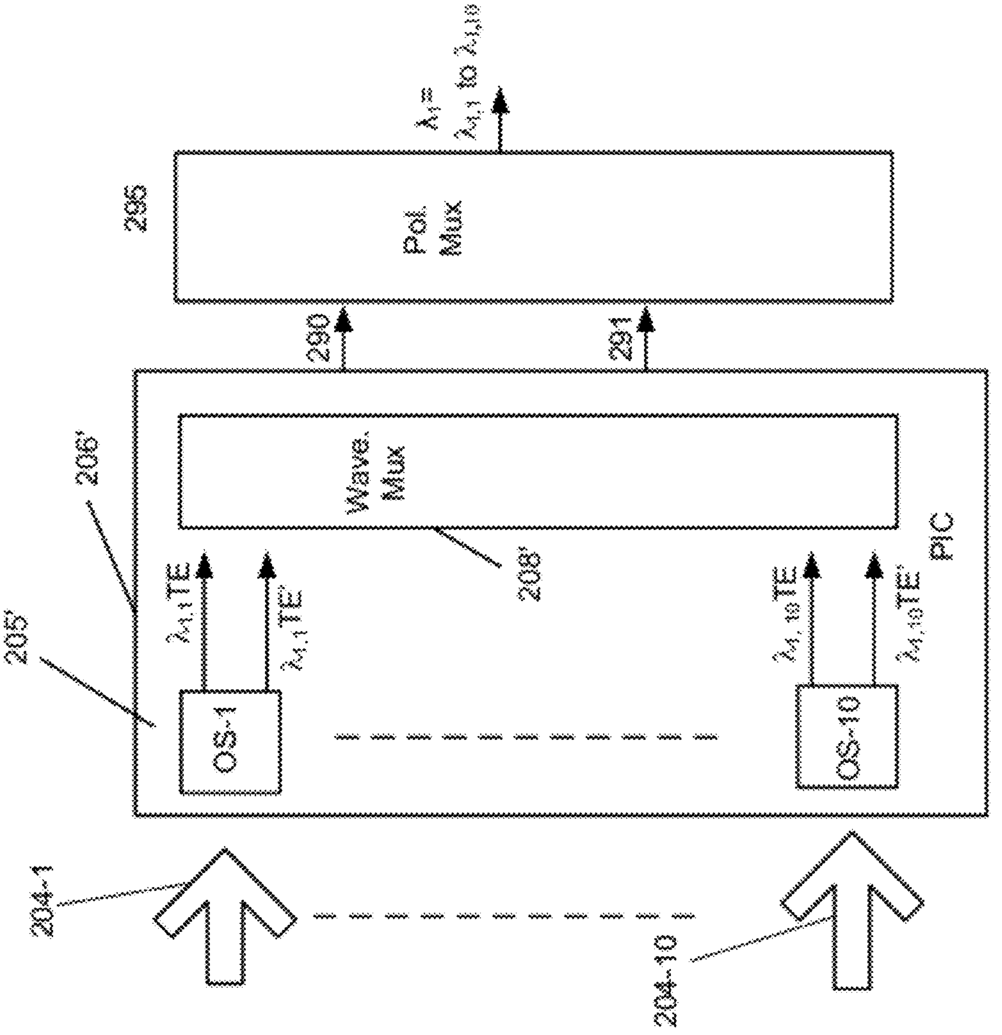

FIG. 3*b* illustrates an alternative embodiment of a PIC 206' according to one aspect of the present disclosure. As further shown in FIG. 3*b*, each of optical sources OS-1 to OS-10 may supply a corresponding pair of modulated optical signals (for example, a respective one of pairs λ1,1TE, λ1,1 TE' . . . λ1,10TE, λ1,10TE') to wavelength multiplexing circuitry 208'. Typically, each optical signal within a given pair has the same or substantially the same wavelength, e.g., each of optical signals λ1,1TE and λ1,1TE' have wavelength λ1,1. In one example, each of optical signals λ1,1TE to λ1,10TE are multiplexed by wavelength multiplexing circuitry 208' into a first WDM output 290 and each of optical signals λ1,1TE' to λ1,10TE' are multiplexed into a second WDM output 291. Wavelength multiplexing circuitry 208' may include one or more broadband power combiners.

The first (290) and second (291) WDM outputs may be provided to polarization multiplexing circuitry 295, including for example a polarization beam combiner. In one example, first WDM output 290 may have a transverse electric (TE) polarization and is supplied to polarization multiplexing circuitry 295 by polarization maintaining optical fiber, such that the polarization of each optical signal in the first WDM output 290 has the TE polarization upon input to polarization multiplexing circuitry 295. The second WDM output 291 may also have a TE polarization when output from wavelength multiplexer 208', but the second WDM output 291 may be provided to a second polarization maintaining fiber that is twisted in such a way that the polarization of each optical signal in the second WDM output 291 is rotated, for example, by 90 degrees. Accordingly, each such optical signal may have a transverse magnetic (TM) polarization when supplied to polarization multiplexing circuitry 295. Polarization multiplexing circuitry 295, in turn, combines the two WDM optical outputs to provide a polarization multiplexed WDM optical signal or superchannel of wavelength λ1 that includes carriers λ1,1 to λ1,10.

The above functionality of PIC 206', shown in FIG. 3*b*, is described in greater detail in U.S. patent application Ser. No. 12/981,835, titled "Method and Apparatus For Local Optimization of an Optical Transmitter", filed Dec. 30, 2010, the entire contents of which are incorporated herein by reference.

Figure 4A:
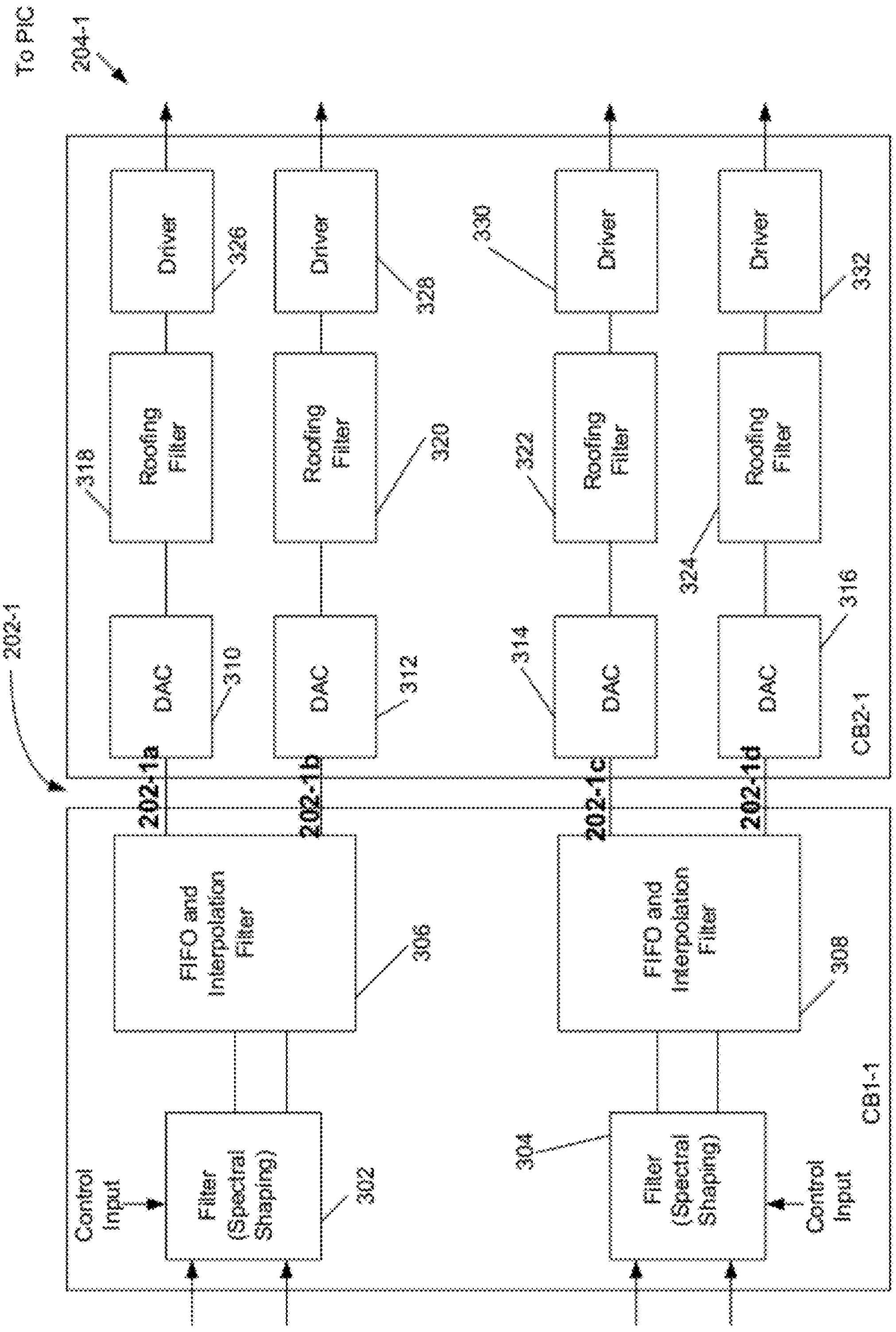
FIGS. 4*a* and 4*b* illustrate a portion of the transmitter block shown in FIGS. 3*a* and 3*b* in further detail consistent with an aspect of the present disclosure.

FIG. 4*a* illustrates circuit block CB1-1 of DSP 202 and circuit block CB2-1 of ASIC 204 in greater detail. First portions of Data-1 may be processed within DSP circuitry 202 (also referred to as "DSP" herein) and supplied to additional circuitry, such as digital filter 302, while second portions of Data-1 may be processed within DSP 202 and supplied to digital filter 304. Digital filters 302 and 304 operate such that modulated optical signals supplied by optical source OS-1, for example, have a desired spectral shape or bandwidth. Such spectral shaping is desirable in order to reduce interference with an adjacent channel, as noted above. In one example, DSP 202 and filters 302 and 304 operate on samples ("first samples") of the first and second data portions at a given first sample or sampling rate or data rate. Digital filters 302 and 304 include known raised-cosine filters implemented with a Fast Fourier Transform (FFT). In addition, as generally understood, digital filters 302 and 304 have an associated "roll-off" factor (α). Consistent with the present disclosure, however, such "roll-off" is adjustable or changed in response to different control inputs to filters 302 and 304. Such adjustable roll-off results in digital filters 302 and 304 having a variable or tunable bandwidth that supports the variable bandwidth of the carriers according to the modulation format employed on the superchannel. It is understood that the control inputs may be any appropriate signal, information, or data that is supplied to filters 302 and 304, such that the "roll-off" is changed in response to such signal, information or data.

The filtered outputs (electrical signals) or filtered data supplied from filters 302 and 304 are supplied to FIFO and interpolation filter (circuit) blocks 306 and 308. As discussed in greater detail below, these circuit blocks interpolate the first samples and output second samples of the filtered data at a second sampling or data rate, which is typically higher than the first sampling rate or data rate. FIFO and interpolation filter 306 outputs data samples 202-1*a* and data samples 202-1*b* to DACs 310 and 312, respectively, and FIFO and interpolation filter 308 outputs samples 202-1*c* and 202-1*d* to DACs 314 and 316, respectively.

Figure 4B:
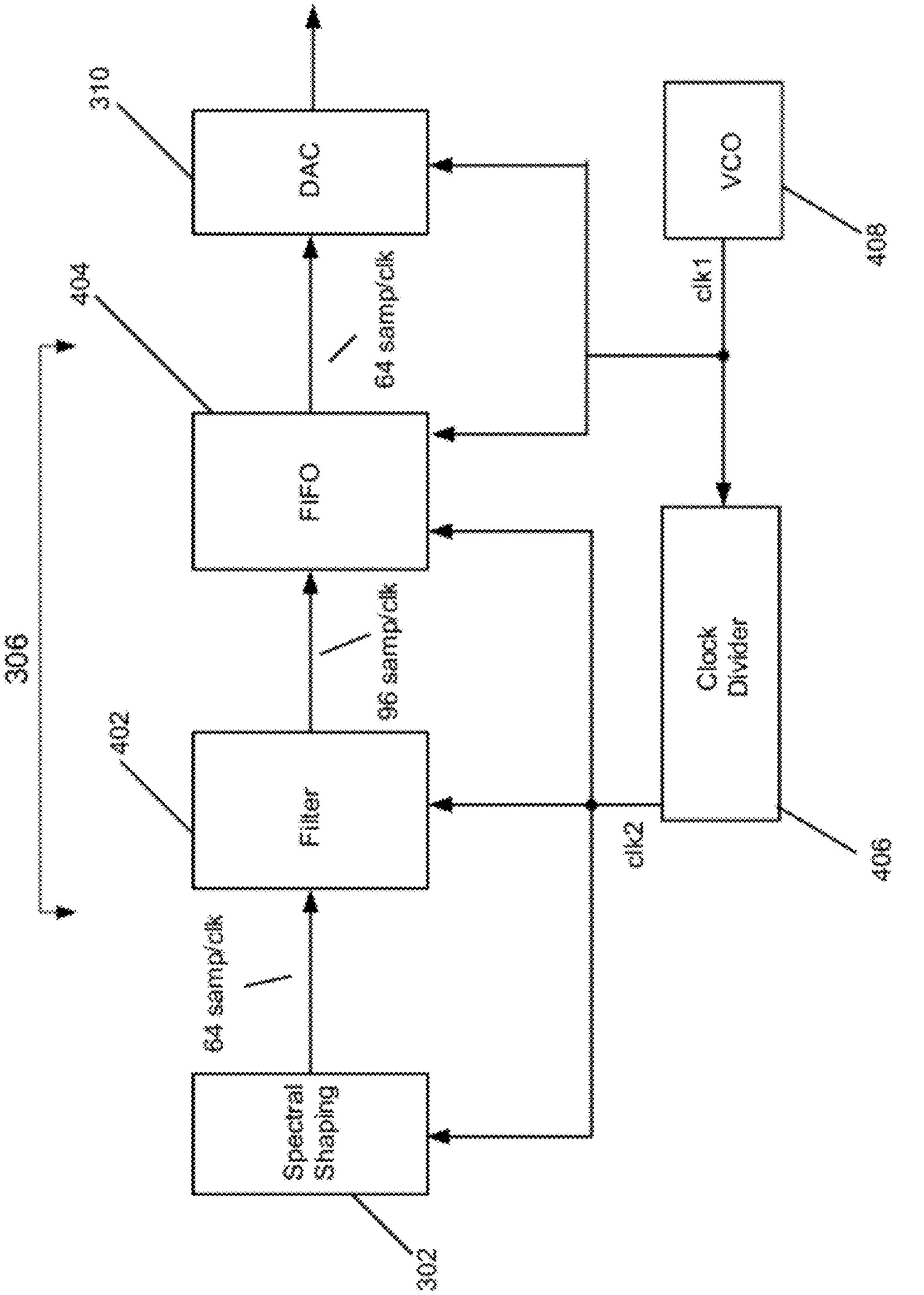

A portion of FIFO and interpolation circuit or "interpolation circuit" 306 supplying samples 202-1 a will next be described with reference to FIG. 4*b*.

Interpolation circuit 306 includes a filter, such as a polyphase filter (although another known filter, such as a finite impulse response (FIR) filter may be provided instead) and a memory, such as a first-in-first-out memory (FIFO) 404. Although the memory is shown as a FIFO in the example FIG. 4*b*, the memory may include other suitable memories. Interpolation circuit 306 may also include a voltage controlled oscillator (VCO) 408, as well as clock divider circuit 406. VCO 408 supplies a clock signal clk1 to DAC 310 and clock divider circuit 406, and is used to control an output of FIFO 404. Clock divider circuit 406, in turn, outputs a clock signal clk2 which is slower or has a lower clock rate than clock signal clk1.

In operation, slower clock signal clk2 is supplied to filter 302 such that filter 302 outputs, in this example, 64 samples per each cycle of clock signal clk2. Poly-phase filter 402 receives the samples output from output from filter 302 and outputs 96 interpolated samples per cycle of clock signal clk2 to FIFO 404. An input of FIFO 404 receives these 96 samples at a rate associated with clock signal clk2. At the output of FIFO 404, however, these samples (202-1*a*) are output to DAC 310 at a higher clock rate associated with clock signal clk1. Here, clock signal clk1 has a clock rate that is 3/2 times the clock rate of clock signal clk2. Thus, although 1.5 times the number of samples are input to FIFO 404, such samples are output from FIFO 404 at 1.5 times the rate that they are input to FIFO 404. As a result, the net flow of data samples into and out of FIFO 404 may be the same. Accordingly, as noted above, DAC 310 may operate at a higher sampling or data rate than filter 302. That is, data is "up sampled" consistent with this aspect of the present disclosure.

It is noted, however, that the present disclosure is not limited to the numbers of samples, sampling rates, clocks, and clock rates discussed above. In addition, other circuitry in FIFO and interpolation filter 306 similar to that shown in FIG. 4*a* may supply higher rate samples to DAC 312. Further, it is understood that FIFO and interpolation filter 308 may have the same or similar structure of FIFO and interpolation filter 306.

Additional and detailed functionality and configuration of FIFO and interpolation filter (circuit) blocks 306 and 308 and other functionality of transmit node 11 and receive node 18 are described in greater detail in U.S. patent application Ser. No. 12/791,694 titled "Method, System, And Apparatus For Interpolating An Output Of An Analog-To-Digital Converter", filed Jun. 1, 2010, U.S. patent application Ser. No. 12/897,784, titled "Wavelength Division Multiplexed Optical Communication System Having Variable Channel Spacings", filed Oct. 5, 2010, and U.S. patent application Ser. No. 12/981,835, referenced above, the entire contents of each of which are incorporated herein by reference.

Returning to FIG. 4*a*, DACs 310 and 312 output corresponding analog signals in response to output data samples 202-1*a* and 202-1*b* from circuit 306, and DACs 314 and 316 output corresponding analog signals in response to samples 202-1*c* and 202-1*d* received from circuit 308. The analog signals output from DACs 310 and 312 are filtered by low-pass or roofing filters 318 and 320 to thereby remove, block or substantially attenuate higher frequency components in these analog signals. Such high frequency components or harmonics are associated with sampling performed by DACs 310 and 312 and are attributable to known "aliasing." The analog signal output from DACs 314 and 316 are similarly filtered by roofing filters 322 and 324. The filtered analog signals output from roofing filters 318, 320, 322, and 324 may next be fed to corresponding driver circuits 326, 328, 330, and 332, which supply modulator driver signals that have a desired current and/or voltage for driving modulators present in PIC 206, as discussed in greater detail below with reference to FIG. 5.

Figure 5:
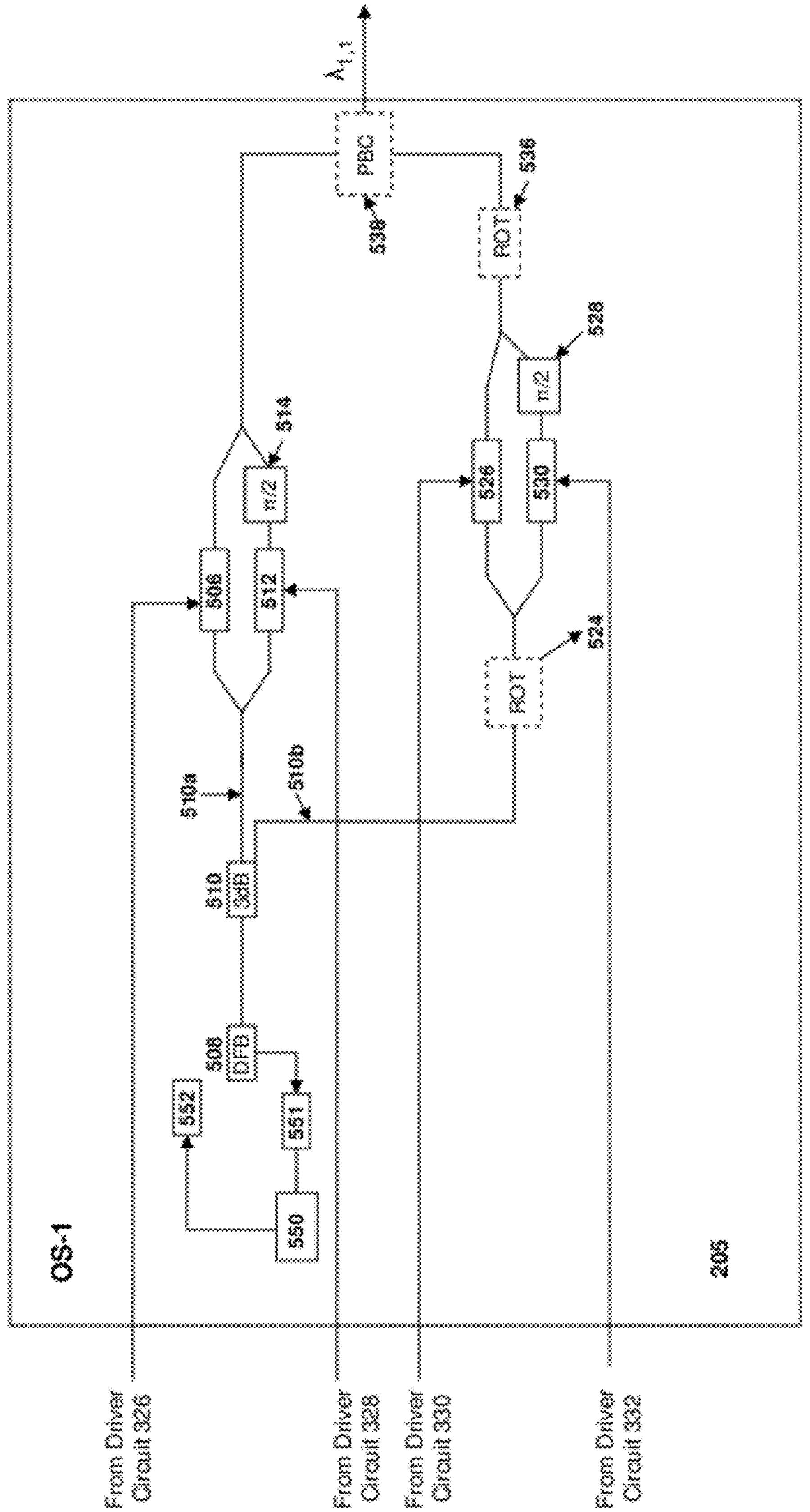
FIG. 5 illustrates a portion of a transmitter photonic integrated circuit (PIC) consistent with the present disclosure.

FIG. 5 illustrates optical source OS-1 in greater detail. It is understood that remaining optical sources OS-2 to OS-10 have the same or similar structure as optical source OS-1.

Optical source OS-1 is preferably provided on a substrate 205 and includes a laser 508, such as a distributed feedback laser (DFB) that supplies light to at least four (4) modulators 506, 512, 526 and 530. DFB 508 outputs continuous wave (CW) light at wavelength λ1,1 to a dual output splitter or coupler 510 (e.g. a 3 db coupler) having an input port and first and second output ports 510*a* and 510*b*. Typically, the various components of optical source OS-1 are connected using waveguides that may be polarization dependent. A first output 510*a* of coupler 510 supplies the CW light to modulator 506 and modulator 512. Similarly, the second output 510*b* is coupled to modulator 526 and modulator 530. Modulators 506, 512, 526 and 530 are, for example, Mach Zender (MZ) modulators. Each of the MZ modulators receives CW light from DFB 508 and splits the light between two (2) arms or paths. An applied electric field in one or both paths of a MZ modulator creates a change in the refractive index such that a phase of light output from the MZ modulator is shifted or changed relative to light input to the MZ modulator. Thus, appropriate changes in the electric field based on drive signals provided from driver circuits 326, 328, 330 and 332 can cause the desired changes in phase of the light output from the respective MZ modulators. In accordance with a desired embodiment, driver circuits 326, 328, 330 and 332 are enabled to control modulators 506, 512, 526 and 530 to modulate the incoming light from DFB 508 according to a plurality of modulation formats such as polarization multiplexed phase shift keyed (PM-QPSK), and other quadrature amplitude modulation (QAM) formats, such as PM-8QAM, PM-16QAM or PM-32QAM.

The modulated optical signal from MZ modulator 512 is supplied to phase shifter 514 which shifts the phase of the signal 90° (π/2) to generate one of an in-phase (I) or quadrature (Q) components. The signal output from phase shifter 514 is combined with the modulated data signals from MZ modulator 506, which includes the other of the I and Q components. Similarly, MZ modulator 526 outputs modulated optical signals as one of the I and Q components, whereas MZ modulator 530 outputs the other of the I and Q components from phase shifter 528 which shifts the phase of the incoming signal 90° (π/2). A polarization rotator 524 may optionally be disposed between coupler 510 and modulators 526, 530. Polarization rotator 524 may be a two port device that rotates the polarization of light propagating through the device by a particular angle, usually an odd multiple of 90°. Alternatively, polarization rotator 536 may be disposed at the combined output of modulators 526, 530 as shown. In that case, the polarization rotator 536 rotates both the modulated signals from MZ modulators 526 and 530 rather than the CW signal from DFB 508 before modulation.

In one embodiment, such as that shown in FIG. 3*a* for example, the combined modulated data signal from MZ modulators 526 and 530 are supplied to an input of a polarization beam combiner (PBC) 538, which combines or polarization multiplexes the two modulated signals from MZ modulators 526 and 530 with the other two modulated signals from MZ modulators 506 and 512, and outputs a polarization multiplexed optical signal having wavelength λ1,1. In this manner, one DFB laser 508 may provide a CW signal to four separate MZ modulators 506, 512, 526 and 530 for modulating the sub-wavelength channel by utilizing phase shifting and polarization rotation of the transmission signals. Alternatively, multiple CW light sources may be used for each modulator which may increase device complexity, chip real estate, power requirements and associated manufacturing costs. Additional functionality and alternative embodiments of OS-1 consistent with the present disclosure are further described in the above incorporated U.S. patent application Ser. Nos. 12/897,784 and 12/981,835.

The polarization multiplexed output from PBC 538, may be supplied to multiplexer 208 in FIG. 3*a*, along with the polarization multiplexed outputs having wavelength λ1,2 to λ1,*n* from remaining optical sources OS-2 to OS-n. Multiplexer 208, which, as noted above, may include a broadband combiner, supplies a group of optical signals to multiplexer 14 (see FIG. 2*a*). Alternatively, as discussed with respect to FIG. 3*b*, the outputs of OS-1 to OS-n may first be multiplexed using a wavelength multiplexer 208' provided on PIC 206' and then polarization multiplexed off the PIC 206' using polarization multiplexing circuitry 295. It is understood that a PIC 206 or 206' present in each of transmitter blocks 12-2 to 12-*n* operates in a similar fashion and includes similar structure as PIC 206 and 206' as discussed above and shown with respect to FIGS. 3*a*, 3*b* and 5.

The above embodiments in which PIC 206 includes a plurality of optical sources OS-1 to OS-n provided on a substrate 205, enable the exemplary embodiments to spectrally space the sub-wavelength carriers λ1,1 to λ1,10 closely together for each superchannel. Maintaining optimum or minimum spectral spacing between each of the carriers depends in part on the stability of the DFB lasers 508 provided for each optical source OS-n as well as the tenability of the spectral shaping filters 302, 304 and 830, 832 in the transmit node 11 and the receive node 18, respectively. It is understood that environmental conditions, particularly changes in temperature, can seriously affect the stability of a DFB laser. Because the plurality of DFB lasers 508 are provided on a PIC 206 as part of each optical source OS-n, the environmental conditions for each optical source OS-n can be tightly controlled. Thus, the DFB lasers 508 can be stabilized such that they can precisely output light signals at the desired closely spaced sub-wavelengths for optimizing the bandwidth of the superchannel while enabling reliable detection at a receive node 18.

As discussed above, each superchannel in the exemplary embodiments preferably utilizes a constant number of carriers providing a constant bit rate regardless of the modulation format in order to realize a constant maximum data capacity. Thus, the number of optical sources OS-n included in a PIC 206, 206' is determined by the number of carriers utilized for the superchannel. As discussed above, the same number of carriers is provided within a superchannel regardless of a modulation format chosen for the superchannel. Thus, in order to maintain a constant fixed capacity, the symbol rate or baud rate of each of the number of carriers will vary according to the modulation format utilized. The spectral bandwidth of each carrier is related to the baud rate or symbol rate of the carrier, thus as the baud rate varies according to the modulation format, so does the spectral bandwidth. Accordingly, in order for a PIC 206, 206' to support a plurality of modulation formats using a constant number of carriers, each DFB laser 508 for each carrier should be tunable over a wide frequency range to support the varying spectral bandwidth of each carrier. For example, according to one embodiment as described below with respect to FIGS. 10*a*, 10*b* and 10*c*, DFB laser 508 is preferably tunable over 90 GHz. In other words, the DFB laser can support a range of frequencies within a desired 90 GHz spectrum.

According to one embodiment, a wavelength locking circuit 550, as shown in FIG. 5, functions according to known wavelength locking methods. In one embodiment, one or more known etalons 551, for example, may be used in conjunction with a wavelength locking circuit 550 to tune DFB laser 508 to provide a light signal with a wavelength aligned with the desired carrier wavelength. It is known that an etalon exhibits periodic optical transmission characteristics, and that an etalon is characterized by a free spectral range (FSR), or the distance in optical frequency between a pair of adjacent peaks in the transmission spectrum of the etalon. The FSR of an etalon is periodic such that a single etalon 551 can be provided to substantially lock each of a plurality of DFB lasers 508, one for each carrier, at respective periodic wavelengths. Because the individual carriers in an exemplary embodiment are preferably uniformly or periodically spaced, a single etalon can thus be implemented to control each DFB laser 508 in an optical source OS-n. In another embodiment, a plurality of etalons may be utilized to lock the plurality of lasers 508 according to a plurality of varying carrier spacing. Each etalon may be chosen with a FSR that matches the spectral spacing between the adjacent carriers for each of the plurality of modulation formats chosen for the superchannel. The wavelength locking circuit 550 is configured to output a current or voltage signal to a tuning component 552 that is configured to modify or adjust an operating characteristic, such as the temperature, of the DFB laser 508 to output the desired frequency or wavelength. Additional description of another wavelength locking method that may be used in an exemplary embodiment is described in greater detail in U.S. patent application Ser. No. 13/078,890, titled “Apparatus to Control Carrier Spacing in a Multi-Carrier Optical Transmitter” by John McNicol, filed on Apr. 1, 2011, the entire contents of which are incorporated herein by reference.

As noted above, the optical signals or superchannel λ1 output from transmitter block 12-1 are combined with optical signals or superchannels λ2 to λ*n* output from remaining transmitter blocks 12-2 to 12-*n* onto optical communication path 16 and transmitted to receive node 18 (see FIG. 2*a*). In receive node 18, demultiplexer 20 divides the incoming signals into optical signal groupings or superchannels λ1 to λn, such that each superchannel is fed to a corresponding one of receiver blocks 22-1 to 22-*n*. As discussed above, the superchannels λ1 to λn are preferably spaced apart by a specified spectral bandwidth or guard band (GB1 and GB2 shown in FIG. 1*b*) that enables accurate demultiplexing of the superchannels using an optical demultiplexer 20 or a programmable wavelength selective switch WSS 21 shown in FIG. 2*b*.

Figure 6:
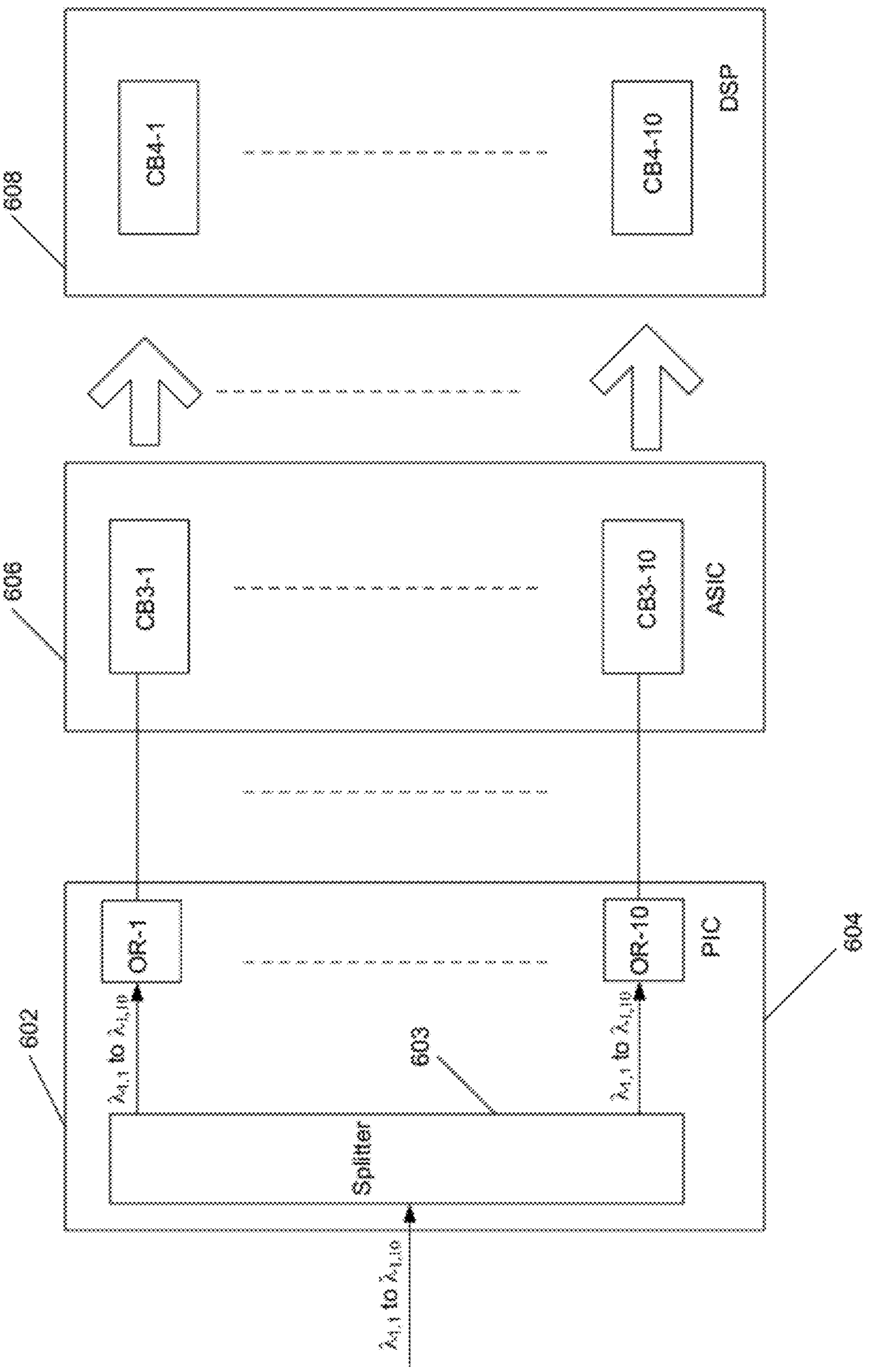
FIG. 6 illustrates a receiver block consistent with an aspect of the present disclosure.

One of receiver blocks 22-1 is shown in greater detail in FIG. 6. It is understood that remaining receiver circuitry or blocks 22-2 to 22-*n* have the same or similar structure as receiver block 22-1.

Receiver block 22-1 includes a receive PIC 602 provided on substrate 604. PIC 602 includes an optical power splitter 603 that receives a band of optical signals having wavelengths λ1,1 to λ1,10, centered around λ1 for example, and supplies a power split portion of each optical signal (each of which itself may be considered an optical signal) to each of optical receivers OR-1 to OR-10. Each optical receiver OR-1 to OR-10, in turn, supplies a corresponding output to a respective one of circuit blocks CB3-1 to CB3-10 of ASIC 606, and each of circuit blocks CB3-1 to CB3-10, supplies a respective output to a corresponding one of circuit blocks CB4-1 to CB4-10 of DSP 608. DSP 608, in turn, outputs a copy of data Data-1 in response to the input to circuit blocks CB4-1 to CB4-10.

Figure 7:
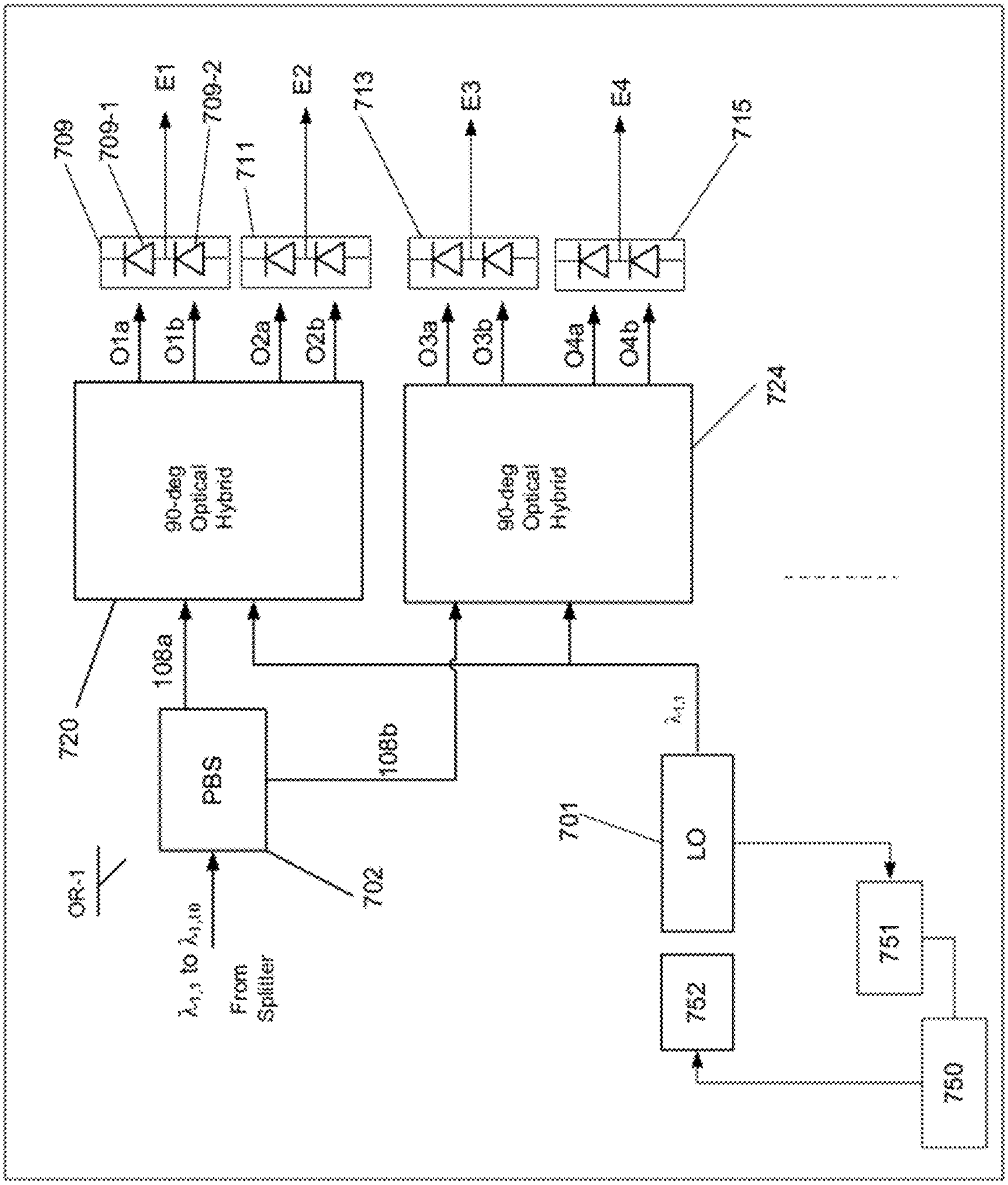
FIG. 7 illustrates a portion of a receiver photonic integrated circuit (PIC) consistent with the present disclosure.

Optical receiver OR-1 is shown in greater detail in FIG. 7. It is understood that remaining optical receivers OR-2 to OR-10 have the same or similar structure as optical receiver OR-1. Optical receiver OR-1 may include a polarization beam splitter (PBS) 702 operable to receive polarization multiplexed optical signals λ1,1 to λ1,10 and to separate the signal into X and Y orthogonal polarizations, i.e., vector components of the optical E-field of the incoming optical signals transmitted on optical fiber medium 108*a* and 108*b*, respectively. The orthogonal polarizations are then mixed in 90 degree optical hybrid circuits (“hybrids”) 720 and 724 with light from local oscillator (LO) laser 701 having wavelength λ1,1. Hybrid circuit 720 outputs four optical signals O1*a*, O1*b*, O2*a*, O2*b* and hybrid circuit 724 outputs four optical signals O3*a*, O3*b*, O4*a*, and O4*b*, each representing the in-phase and quadrature components of the optical E-field on X (TE) and Y (TM) polarizations, and each including light from local oscillator 701 and light from polarization beam splitter 702. Optical signals O1*a*, O1*b*, O2*a*, O2*b*, O3*a*, O3*b*, O4*a*, and O4*b* are supplied to a respective one of photodetector circuits 709, 711, 713, and 715. Each photodetector circuit includes a pair of photodiodes (such as photodiodes 709-1 and 709-2) configured as a balanced detector, for example, and each photodetector circuit supplies a corresponding one of electrical signals E1, E2, E3, and E4. Alternatively, each photodetector may include one photodiode (such as photodiode 709-1) or a single-ended photodiode. Electrical signals E1 to E4 are indicative of data carried by optical signal of λ1,1 as extracted by the optical hybrids 720 and 724 according to the LO 701 tuned to λ1,1. For example, these electrical signals may comprise four base-band analog electrical signals linearly proportional to the in-phase and quadrature components of the optical E-field on X and Y polarizations. As similarly discussed with respect to the transmit PIC 206, the LO 701 of each optical receiver can be precisely tuned according to the desired sub-wavelength λ1,1, for example, to reliably extract the sub-wavelength carrier λ1,1 from the other densely packed sub-wavelength carriers λ1,2 to λ1,10 of the received superchannel. As discussed above, each LO 701 is preferably tunable over a wide frequency range in order to support the range of frequencies or wavelengths of the carriers according to one of the plurality of modulation formats. As shown, OR-1 preferably includes one or more etalons 751 in conjunction with a wavelength locking circuit 750 and a tuning component 752 that function similarly to etalon 551, wavelength locking circuit 550 and tuning component 552 discussed above.

Figure 8:
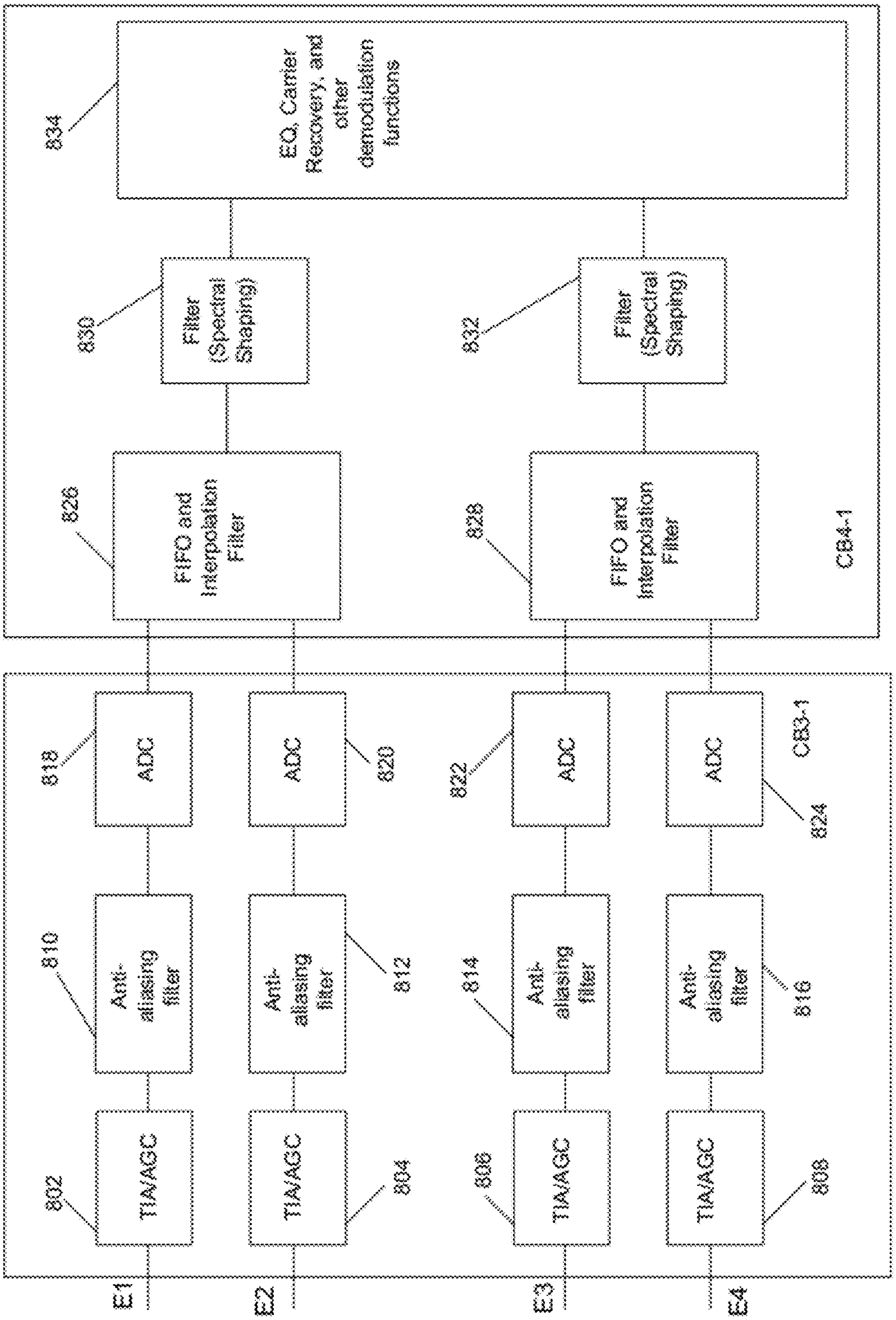
FIG. 8 illustrates a portion of the receiver block shown in FIG. 6 consistent with an aspect of the present disclosure.

FIG. 8 shows circuitry or circuit blocks CB3-1 and CB4-1 in greater detail. It is understood that remaining circuit blocks CB3-2 to CB3-10 of ASIC 606 have a similar structure and operate in a similar manner as circuit block CB3-1. In addition, it is understood that remaining circuit blocks CB4-2 to CB4-10 of DSP 608 have a similar structure and operate in a similar manner as circuit block CB4-1.

Circuit block CB3-1 includes known transimpedance amplifier and automatic gain control (TIA/AGC) circuitry 802, 804, 806, and 808 that receives a corresponding one of electrical signals E1, E2, E3, and E4. Circuitry 802, 804, 806, and 808, in turn, supplies corresponding electrical signals or outputs to respective ones of anti-aliasing filters 810, 812, 814, and 816, which constitute low pass filters that further block, suppress, or attenuate high frequency components due to known "aliasing". The electrical signals or outputs from filters 810, 812, 814, and 816 are then supplied to corresponding ones of analog-to-digital converters (ADCs) 818, 820, 822, and 824.

ADCs 818, 820, 822, and 824, may sample at the same or substantially the same sampling rate as DACs 310, 312, 314, and 316 discussed above. Preferably, however, circuit block CB4-1 and DSP 608 have an associated sampling rate that is less than the DAC sampling rate. At such a high sampling rate, DSP 608 and its associated circuitry or circuits would consume excessive power and would require a relatively complex design. Accordingly, in order to reduce the rate that samples are supplied to and processed by DSP 608, FIFO interpolation and filter circuits 826 and 828 are implemented to provide samples at a lower sampling rate than that associated with ADCs 818, 820, 822, and 824. The operation and structure of FIFO interpolation and filter circuits 826 and 828 are similar to those described above with respect to FIFO interpolation and filter circuits 306 and 308 in a transmit node described above in FIG. 4*b*, and discussed below with respect to FIG. 11. Additional functionality and configuration of a FIFO interpolation and filter circuit 826 in a receive node are described in greater detail in U.S. patent application Ser. No. 12/791,694 titled "Method, System, And Apparatus For Interpolating An Output Of An Analog-To-Digital Converter", filed Jun. 1, 2010, the entire contents of which are incorporated herein by reference.

The electrical signals or outputs of circuits 826 and 828 are provided to filters, such as digital filters 830 and 832, which may perform spectral shaping in a known manner similar to that discussed above in connection with filters 302 and 304 (see FIG. 3) to select a data stream, information stream, or data within a bandwidth associated with filters 830 and 832. Such data or information stream also corresponds to one of the optical signals, e.g., the optical signal having wavelength λ1,1. In addition, the outputs of filter circuits 830 and 832 are next fed to processor circuitry 834 that performs equalization, carrier recovery, and other known demodulation tasks. CB4-1, as noted above, then outputs a copy of a portion of data Data-1 from receive node 18.

As noted above, because the individual carriers λ1,1 to λ1,10 can be separated from each other using the exemplary receiver techniques in each respective OR-n, the electronic or digital filters in receive node 18, such as filters 830 and 832 can electronically filter the desired data carried by each of the sub-wavelength channels (e.g. λ1,1 to λ1,10) of superchannel wavelength λ1. In order to minimize errors in such data attributable to aliasing in transmit node 11, upsampling of the data output from filters 302 and 304 is performed so that the DACs in transmit node 11 operate at a higher sampling rate than the sampling rate associated with filter 302 and 304. As a result, high frequency harmonics are spectrally spaced from the bandwidth associated with the data to be transmitted, and such harmonics can then be readily filtered by roofing filters 318 and 320, for example. Thus, upsampling in transmit node 11 may facilitate detection and electrical filtering of data carried by an optical signal without optically demultiplexing the individual sub-wavelength channels λ1,1 to λ1,10.

Figure 9:
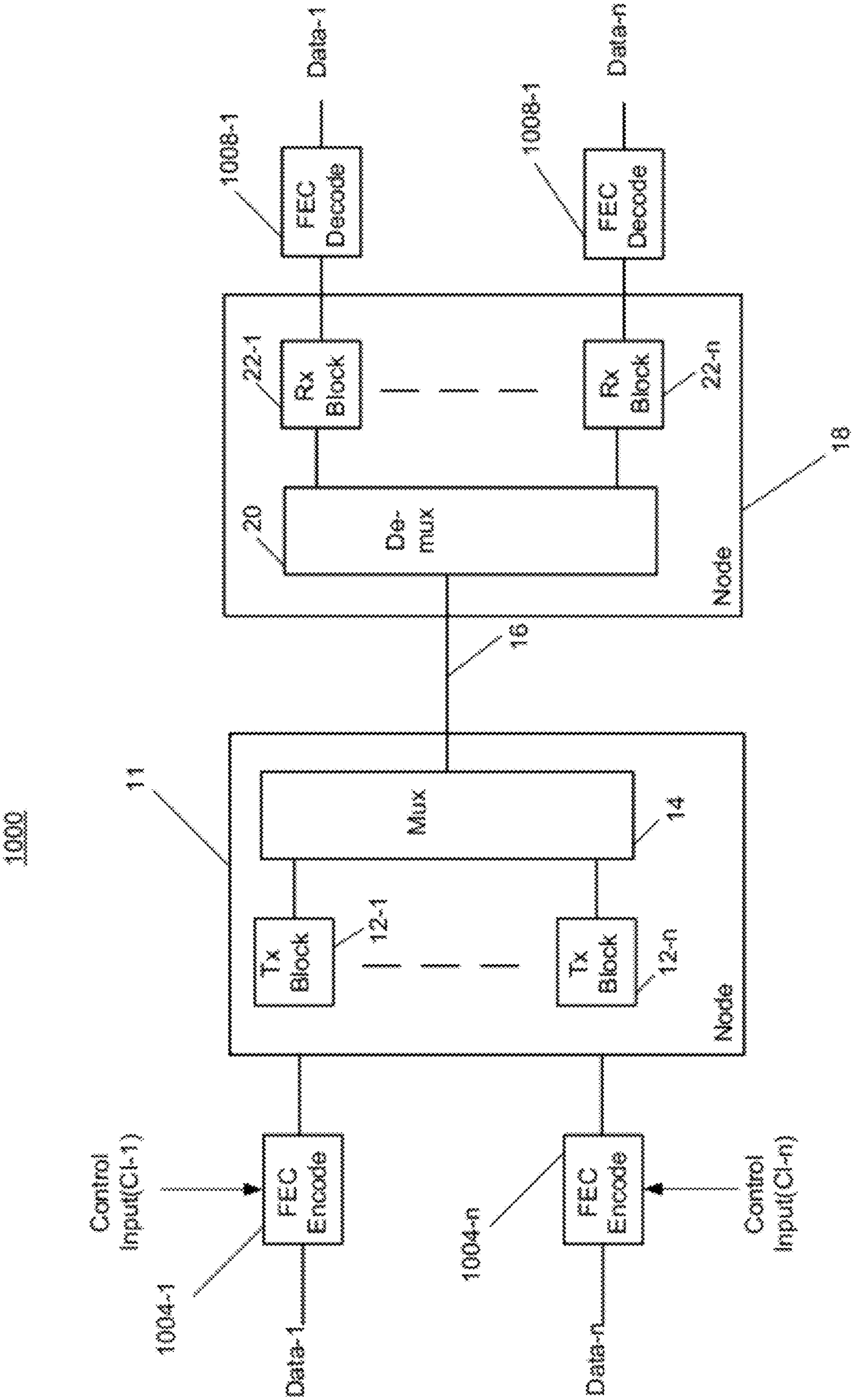
FIG. 9 illustrates an example of an optical link consistent with an additional aspect of the present disclosure.

FIG. 9 illustrates an example of an optical communication link 1000 consistent with an additional aspect of the present disclosure. Link 1000 includes forward error correction (FEC) encoder circuits 1004-1 to 1004-*n* that FEC encode data (such as Data-1 to Data-n) supplied to transmitter blocks 12-1 to 12-*n*. The additional FEC data may be combined with the transmit data as an overhead portion. Accordingly, the amount of data (payload and overhead) carried by each carrier is increased, and thus the data, symbol or baud rate associated with each carrier is also increased. After propagating through link 1000, the data carried by optical signals output from transmitter blocks 12-1 to 12-*n* is demultiplexed according to optical channel groupings in receive node 18, processed (as noted above), and then output to FEC decoder circuits 1008-1 to 1008-*n*. FEC decoder circuits 1008-1 to 1008-*n*, in turn, decode the outputs from receiver blocks 22-1 to 22-*n* to supply copies of Data-1 to Data-n.

In one example, a control input CI-1 may be supplied to FEC encoder circuit 1004-1 to adjust the amount of FEC encoding or the number of error correcting bits or bytes output therefrom and included in each carrier output from transmitter block 12-1. In addition, a different control input CI-n may be supplied to FEC encoder circuit 1004-*n* to control or adjust the number of error correcting bits or bytes output therefrom and included in each frame output from transmitter block 12-*n*. In another example, the number of error correcting bits for each carrier output from transmitter block 12-1 (as well as output from FEC encoder circuit 1004-1) may be less than the number of error correcting bits in each carrier output from transmitter block 12-*n* (as well as output from FEC encoder circuit 1004-*n*). It is understood that the control inputs may be any appropriate signal, information, or data that is supplied to the encoder circuits, such that the number of error correcting bits in each frame is changed in response to such signal, information or data.

In accordance with the above systems and methods, the optical communication system 100 shown in FIG. 1*a* can be configured to transmit a plurality of superchannels SC1, SC2 and SC3, for example, between a plurality of nodes N1 to N14 as desired. Exemplary methods for configuring a carrier plan for the superchannels SC1, SC2 and SC3 are discussed further below.

In accordance with one embodiment, the three optical signals or superchannels SC1, SC2 and SC3, shown in FIG. 1*a*, may each be modulated using different modulation formats. As discussed above, the modulation format of an optical signal may be determined based on the desired reach or distance the signal is required to span or travel. For example, a lower order polarization multiplexed quadrature phase shift keyed (PM-QPSK) modulation format transmitting 4 bits per symbol, that is less susceptible to noise and filtering effects in the optical communication system 100, may be employed for the optical signal or superchannel SC1 spanning a great distance from node N1 to node N5. More complex modulation formats may utilize known higher order quadrature amplitude modulation (QAM) techniques of varying complexity according to shorter transmission distances. For example, the second superchannel SC2 spanning an intermediate distance between node N1 and node N4 may be modulated with 6 bits per symbol according to polarization multiplexed 8-QAM (PM-8QAM). Further, the third superchannel SC3 spanning the shorter distance from node N1 to node N3 may be modulated with 8 bits per symbol according to polarization multiplexed 16-QAM (PM-16QAM). The distance any given superchannel is desired to travel can vary, thus it is advantageous to enable hardware, such as PIC 206 shown in FIG. 3*a*, to be able to generate a superchannel according to a plurality of modulation formats as desired.

As discussed above with respect to FIG. 1*a*, an exemplary optical communication system 100 includes a plurality of nodes N1 to N14 interconnected with each other. At any one node, a plurality of superchannels received from a plurality of other nodes may be interconnected or multiplexed. Each node is capable of add/drop multiplexing the plurality of superchannels, SC1, SC2 or SC3, as well as the carriers of each superchannel. To simplify the optical communication system and to enable the adding, dropping and multiplexing of superchannels and/or the individual carriers of each superchannel at any given node, it is preferred that each of the superchannels is configured according to a common parameter.

For example, in one embodiment, each superchannel SC1, SC2 or SC3 may be configured to occupy a substantially constant spectral bandwidth. A constant spectral bandwidth may be achieved for each superchannel, for example, by configuring each superchannel to include the same number of optical carriers providing data at a substantially constant baud rate or symbol rate. While this implementation may be convenient, the data capacity or throughput of the superchannel will vary according to the modulation format utilized for the carriers. For example, at a fixed baud rate of 12.5 Gbaud, assuming no overhead for framing or forward error correction, the nominal bit rate for each carrier utilizing polarization multiplexed binary phase shift keyed PM-BPSK, PM-QPSK, PM-8QAM and PM-16QAM, would be 25, 50, 75 and 100 Gb/s, respectively. Thus, utilizing a constant number of carriers, such as ten for example, as shown in FIG. 1*b* and discussed throughout, the total capacity of each superchannel would range from 250, 500, 750 and 1000 Gb/s.

In the exemplary optical communication system 100 shown in FIG. 1*a*, such an embodiment, however, may result in stranded capacity and inefficient use of the optical system. In other words, because the data rate or capacity of each superchannel would vary with the modulation format of the individual carriers, the overall system capacity is inefficiently limited by the superchannels modulated at the lower order modulation formats (BPSK, PM-QPSK, etc). Furthermore, the multiplexing or interconnection, at a node N1 to N14, for example, of a plurality of superchannels of varying capacity may result in capacity being unused or stranded due to a total capacity exceeding an interconnect capacity at an interconnect node, N1 to N14, in the network. Thus, in the exemplary optical communication system 100 in which the transmitted data can be flexibly switched and interconnected with other superchannels to maximize functionality of the network 100, the non constant data throughput poses a problem.

Accordingly, in an alternative embodiment, each superchannel, SC1, SC2, SC3, of the optical communication system 100, is configured to provide a substantially constant capacity, bit rate or data rate regardless of the modulation format chosen for the carriers of each superchannel SC1, SC2, SC3. In one embodiment, to efficiently utilize the network capacity, the bandwidth occupied by each superchannel may also be varied according to the modulation format chosen, while maintaining the substantially constant capacity or bit rate.

Exemplary embodiments of the present disclosure are realized that generate a superchannel from one PIC 206, 206', shown in FIGS. 3*a* and 3*b*, at data rates that can exceed 1000 Gb/s (1 Tb/s), for example. As discussed above, the advent of many data intensive applications for the Internet and their pervasive use will drive the necessity for 1 Tb/s service. While the embodiments below are disclosed with respect to achieving 1 Tb/s data rates, it should be understood that any maximum capacity or constant data rate may be employed using the exemplary methods.

In the exemplary embodiments, a PIC 206 shown in FIG. 3*a* is preferably configured to support a plurality of modulation formats using a predetermined number of carriers providing a constant bit rate. Because the number of carriers and bit rate of each carrier are substantially constant for each modulation format, the architecture and operation of a transmit node 11 is simplified. For example, as shown in FIG. 2*a* and according to an exemplary embodiment, incoming data Data-1 comprising 1000 Gbits of data needs to be distributed among the total number of carriers utilized in the transmitter block 12-1. Because each carrier provides the same bit rate, the incoming data Data-1 can be evenly dispersed between each of the carriers, thus, eliminating any need for complex routing or switching architecture in a transmit node 11 to divide the incoming data between varying numbers of carriers.

Additionally, to enable equal dispersion of the incoming data between the total number of carriers, the number of carriers should be chosen according to the desired constant or maximum capacity of the superchannel. The Optical Transport Network standard (OTN) defines a plurality of data blocks or optical data units (ODUs), similar to a frame size, for transport through an optical communications network. An ‘ODUO’ is defined as the basic building block for data transport and is sized to carry 1.25 Gbs of data. Thus, a superchannel providing 1 Tb/s of data capacity preferably transmits 800 ODUOs (1000/1.25). It is preferred that an integer number of ODUOs is provided on each carrier. Thus, the total number of carriers should be evenly divisible into 800, for example. According to the exemplary embodiments, as further discussed below, a PIC 206 is configured to provide either eight, ten, or sixteen carriers, each providing 100, 80 and 50 ODUOs, respectively. Accordingly, with reference to FIG. 3*a*, each transmitter block 12-*n* of node 11 is preferably configured with either eight, ten, or sixteen CB1 blocks, CB2 blocks and optical source blocks, one for each carrier.

The total number of carriers should preferably be chosen to optimize the optical communication system performance according to a specific embodiment. For example, as the number of carriers increases, the baud rate of each carrier proportionally decreases to maintain a constant capacity or bit rate. The increased number of carriers increases hardware complexity of the transmit node 11 and receive node 18 while reducing errors and other effects in the signal processing that result from higher baud rates. Thus, there is a tradeoff between optimizing the total number of carriers in consideration of the corresponding baud rates for each carrier.

In order to maintain a constant data capacity carried by each superchannel with a fixed number of carriers each providing a fixed data rate, the baud rate of each of the carriers is preferably variably controlled according to the chosen modulation format. Accordingly, the baud rate or symbol rate for each carrier can be reduced at higher order modulation formats because a greater number of bits are provided for each symbol. To maintain a constant data capacity and to optimize the occupied bandwidth of the superchannel, the baud rate is varied inversely proportional to the number of bits per symbol carried according to the chosen modulation format. For example, a carrier employing 8QAM modulation preferably requires a baud rate reduced by ⅓ relative to a QPSK modulated carrier because QPSK has a modulation rate of ⅔ the number of bits per symbol as 8QAM. Accordingly, a carrier employing 16-QAM modulation may utilize a baud rate half that of a QPSK carrier because 16-QAM utilizes a modulation rate of twice the number of bits per symbol as does QPSK.

Figure 10A:
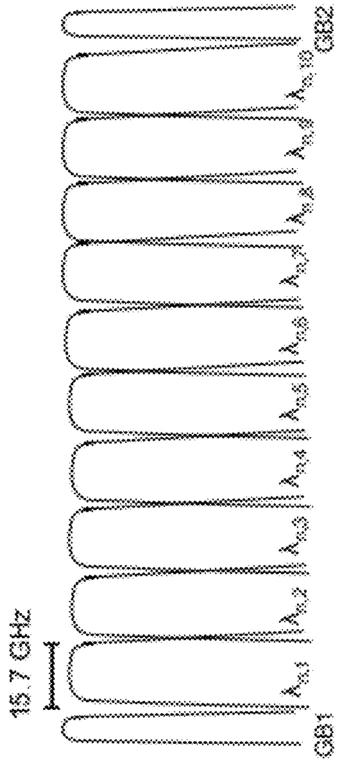
FIGS. 10*a*, 10*b* and 10*c* illustrate carrier plans of a superchannel consistent with aspects of the present disclosure.
Figure 10B:
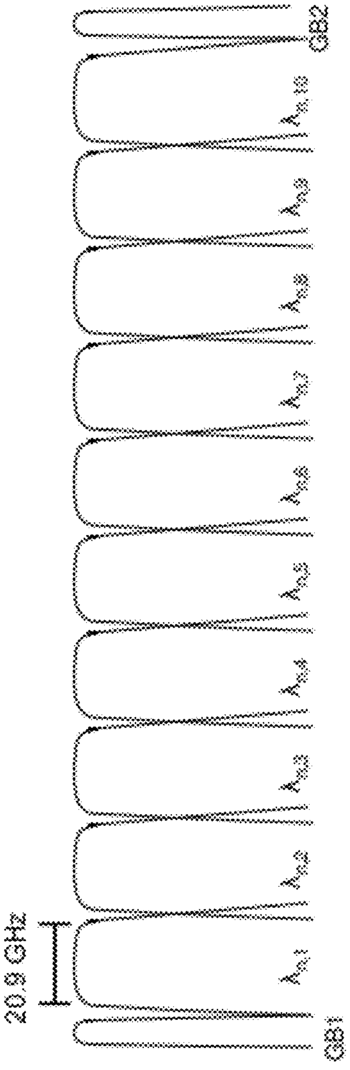
Figure 10C:
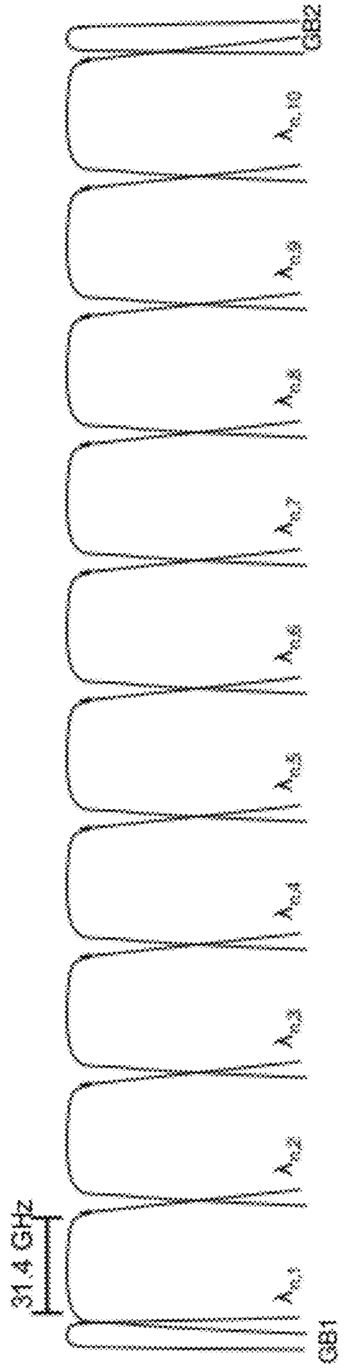

As shown in FIG. 10*a*, according to an exemplary embodiment, PIC 206 outputs a superchannel comprising ten carriers λn,1 to λn,10. In this embodiment, each of the carriers λn,1 to λn,10 are modulated using a 16-QAM modulation format, thus each symbol carriers 8 bits of data. Because there are ten carriers, each carrier should carry the data equivalent of 80 ODUOs or 100 Gb/s at a nominal baud rate of 12.5 Gbaud (100/8). The baud rate for each carrier may be increased by 25 percent, for example, due to additional information required for FEC encoding and other overhead, resulting in a baud rate of approximately 15.7 Gbaud. FIG. 10*b* illustrates a carrier arrangement or plan according to the same embodiment except that each carrier is modulated using an 8-QAM modulation format. Because 8-QAM carries 6 bits of data per symbol, each carrier is provided at a nominal baud rate or symbol rate of approximately 16.7 Gbaud which may be increased to approximately 20.9 Gbaud due to the 25 percent overhead discussed above. FIG. 10*c* illustrates a carrier arrangement according to this embodiment in which each carrier λn,1 to λn,10 is modulated utilizing a QPSK modulation format, such that 4 bits of data are carried per symbol at a nominal baud rate of 25 Gbaud, which may be increased to 31.4 Gbaud due to overhead, for example.

As shown in FIGS. 10*a*, 10*b*, and 10*c*, the baud rate and therefore spectral bandwidth of the individual carriers is reduced proportionately to the change in modulation format. Moreover, the spectral bandwidth is efficiently reduced such that the spectral bandwidth of the 16-QAM carriers in FIG. 10*a* is one half the bandwidth of the QPSK carriers shown in FIG. 10*c*, and the bandwidth for the 8-QAM carriers shown in FIG. 10*b* is two-thirds the bandwidth of the QPSK carriers in FIG. 10*c*. Accordingly, the overall occupied bandwidth of each superchannel is optimized according to the modulation format chosen, thus efficiently utilizing the available optical bandwidth in an optical communication system. The total occupied bandwidth of each of the superchannels shown in FIGS. 10*a*, 10*b* and 10*c* is determined based on the relative channel spacing between each carrier, which is preferably minimized, plus any occupied spectrum of a guard band provided on both ends of the band of carriers, as discussed above. Thus, as shown in FIGS. 10*a*, 10*b*, and 10*c*, according to this embodiment, assuming a carrier spacing of 1.07 times the individual carrier bandwidth or baud rate, plus two guard bands GB1 and GB2 of 7 GHz each, the total bandwidth of the 16-QAM superchannel is approximately 182 GHz, whereas the 8-QAM superchannel occupies approximately 238 GHz and the QPSK superchannel occupies approximately 350 GHz.

According to the above example, the right most carrier or edge carrier λn,10 of the 16-QAM superchannel shown in FIG. 10*a*, is shifted by approximately 90 GHz, to left from the right most carrier or edge carrier λn,10 of the QPSK superchannel shown in FIG. 10*c*. Accordingly, the left most carrier or edge carrier λn,1 of the 16-QAM superchannel shown in FIG. 10*a*, is also shift by approximately 90 GHz to the right of the left most carrier or edge carrier λn,1 shown in FIG. 10*c*. Thus, in order for a PIC 206, for example, to provide each of the superchannels shown in FIGS. 10*a*, 10*b* and 10*c* according to the above embodiment, the DFB lasers 508 providing the signal for the edge carriers are preferably tunable over 90 GHz, as discussed above with respect to FIG. 5.

Additionally, the DSP block 202 and the ASIC block 204 of the transmitter block 12-*n* are preferably configured to modify the baud rate or symbol rate for each of the carriers according to the above embodiment. According to one embodiment, the symbol rate or baud rate for each carrier in the above examples may be adjusted according to the operation of the FIFO and interpolation filter circuit 306 discussed above with respect to FIGS. 4*a* and 4*b*. In the exemplary embodiments, the DAC circuit 310 preferably operates at the same sampling rate with respect to frequency in each modulation format mode. Thus, because the sampling rate of the DAC circuit remains constant, in order to adjust the baud rate, the number of symbols processed per baud interval is adjusted according to a change in modulation format.

Referring back to FIG. 4*b*, assume, for example, that the implementation as shown in the figure is utilized for processing incoming data Data-1 for a carrier modulated according to QPSK modulation format. As shown in FIG. 4*b*, the spectral shaping filter 302 outputs 64 samples per clock cycle at the rate of clk2. If the modulation mode changes to 8-QAM, for example, clk2 is controlled by clock divider circuit to slow down by ⅓ the rate that clk2 operated with respect to clk1 in the QPSK modulation mode. The clock rate of clk2 is reduced by ⅓ because 8-QAM modulates 3/2 times the number of bits per symbol as does QPSK, therefore at the ⅔ clock rate, 3/2 more samples are processed per clk1. Accordingly, in an 8-QAM modulation mode, 64 samples of incoming data are provided to a poly-phase filter 402, for example, at a ⅔ clock rate with respect to the clock rate for QPSK. Filter 402 is now configured to output 144 samples (96*3/2) per clock cycle of clk2, in order to maintain the same operation at the FIFO circuit 404. Because the sampling rate of the DAC 310 is unchanged between 8-QAM and QPSK, 64 samples per clock cycle clk1 are still provided to the DAC 310 in 8-QAM mode as in the QPSK mode. In other words, because clk2 is reduced by ⅓, in order to maintain the same 64 sample output of the FIFO circuit 404, filter 402 provides 3/2 times more symbols to the FIFO circuit 404 at the reduced clock rate of clk2. The samples output from the DAC 310 are then provided to roofing filter 318 shown in FIG. 4*a*.

It should be apparent from the above example that, when a 16-QAM modulation mode is utilized, clock cycle clk2 is controlled by clock divider circuit 406 to provide a clock signal by one-half the rate of clock cycle clk2 utilized for QPSK modulation because 2 times the number of samples are processed per baud interval, thus the baud rate is reduced by one-half, as described in the above embodiment. Accordingly, in the 16-QAM modulation mode, filter 402 is preferably configured to output 192 samples per clock cycle clk2 to FIFO circuit 404.

Figure 11:
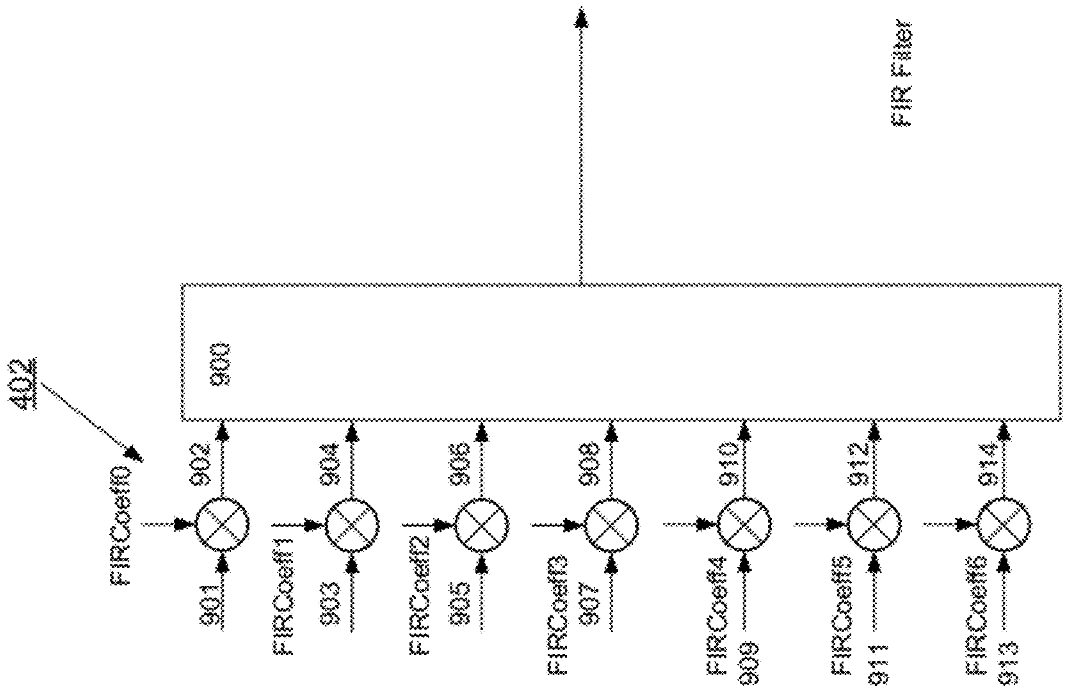
FIG. 11 illustrates an example of an interpolation filter consistent with one aspect of the present disclosure.

According to one embodiment, the poly-phase filter 402 is configurable to provide the varying interpolation rates, as described above, according to the varying modulation format utilized. An example of an FIR filter 402 according to one embodiment is shown in FIG. 11. FIR filter or filter circuit 402, in this example, has seven inputs or taps 901, 903, 905, 907, 909, 911, and 913 that receive data from spectral shaping filter 302. The FIR filter 402 also includes multipliers 902, 904, 906, 908, 910, 912, and 914, filter coefficients FIRCoeff0, FIRCoeff1, FIRCoeff2, FIRCoeff3, FIRCoeff4, FIRCoeff5 and FIRCoeff6, and block 900. According to this embodiment, the input coefficients FIRCoeff0, FIRCoeff1, FIRCoeff2, FIRCoeff3, FIRCoeff4, FIRCoeff5 and FIRCoeff6, are adjusted or varied according to the desired interpolation rate corresponding to the varying modulation format. According to one embodiment the coefficients of FIR filter 402 are precalculated and fixed. Alternatively, the coefficients may be adaptable for optimization in real-time.

Each of the output samples from spectral shaping filter 302 is supplied to a corresponding input or tap 901, 903, 905, 907, 909, 911, and 913 of FIR filter 402 and to a corresponding multiplier 902, 904, 906, 908, 910, 912, and 914, which multiplies the corresponding output sample data by the corresponding coefficient FIRCoeff0, FIRCoeff1, FIRCoeff2, FIRCoeff3, FIRCoeff4, FIRCoeff5, and FIRCoeff6. The resulting products are then summed in block 900 to yield the output of the FIR filter 402.

Additional functionality and configuration of a FIFO interpolation and filter circuit 402, 404 is described in greater detail in U.S. patent application Ser. No. 12/791,694 referenced above, titled "Method, System, And Apparatus For Interpolating An Output Of An Analog-To-Digital Converter", the entire contents of which are incorporated herein by reference.

Accordingly, as further discussed above, the exemplary embodiments are capable of providing a 1 Tb/s superchannel comprising a group of minimally spaced carriers occupying an efficient optical bandwidth, according to the modulation format selected for the superchannel. According to the above embodiments, the superchannel preferably utilizes a constant number of carriers, each providing a substantially constant bit rate, regardless of the modulation format utilized. Thus, the hardware implementation is simplified because the incoming data can be evenly distributed among the constant number of carriers providing data at a constant bit rate. Furthermore, the optical bandwidth is efficiently utilized by reducing the baud rate proportional to the higher order modulation formats utilized.

In the exemplary embodiments, such a high data rate superchannel at minimal spacing between carriers can be realized utilizing electrical filtering components shown in FIGS. 4 and 8 and the plurality of tightly controlled lasers 508 in FIGS. 5 and 701 in FIG. 7, each provided within PIC 206 and 602, respectively. As a result, optical signals having different modulation formats, different levels of FEC encoding, and minimal carrier spacing may be transmitted over different distances and reliably detected so that system capacity may be optimized while minimizing the occupied spectral bandwidth.

Other embodiments will be apparent to those skilled in the art from consideration of the specification. It is intended that the specification and examples be considered as exemplary only, with a true scope and spirit of the invention being indicated by the following claims.

What is claimed is:

1. An apparatus, comprising:

an optical transmitter configured to selectively supply either a first plurality of optical signals or a second plurality of optical signals, each of the first plurality of optical signals being modulated in accordance with a first modulation format, and each of the second plurality of optical signals being modulated in accordance with a second modulation format different than the first modulation format, a number of the first plurality of optical signals being equal to a number of the second plurality of optical signals, each of the first plurality of optical signals having a first symbol rate, such that the first plurality of optical signals carry a plurality of first symbols, each of the plurality of first symbols representing a first plurality of bits, and each of the second plurality of optical signals having a second symbol rate that is different than the first symbol rate, such that the second plurality of optical signals carry a plurality of second symbols, each of the plurality of second symbols representing a second plurality of bits, wherein the collective data rate of the first plurality of optical signals is the same as the collective data rate of the second plurality of optical signals, the optical transmitter including:

a plurality of lasers, each of which outputting a corresponding one of a first plurality of carriers when the optical transmitter supplies the first plurality of optical signals, each of the plurality of lasers also outputting a corresponding one of a second plurality of carriers when the optical transmitter supplies the second plurality of optical signals, each of the first plurality of carriers having a corresponding one of a first plurality of wavelengths and being associated with a respective one of the first plurality of optical signals, each of the second plurality of carriers having a corresponding one of a second plurality of wavelengths and being associated with a respective one of the second plurality of optical signals, a lowest one of the first plurality of wavelengths being less than a lowest one of the second plurality of wavelengths, each of adjacent ones of the first plurality of wavelengths being separated from one another by a first spectral spacing and each of adjacent ones of the second plurality of wavelengths being separated from one another by a second spectral spacing different than the first spectral spacing; and an optical combiner configured to receive the first plurality of optical signals and the second plurality of optical signals, the optical combiner combining either the first plurality of optical signals or the second plurality of optical signals and supplying either the first plurality of optical signals or the second plurality of optical signals to an optical communication path.

2. The apparatus of claim 1, wherein a number of the first plurality of bits is greater than a number of the second plurality of bits.

3. The apparatus of claim 1, further including a substrate, the plurality of lasers being provided on the substrate.

4. The apparatus of claim 1, wherein each of the first plurality of lasers is tunable over a frequency range indicative of a difference between the first symbol rate and the second symbol rate.

5. The apparatus of claim 4, wherein each of the first plurality of lasers is tunable over a frequency range of at least 90 GHz.

6. The apparatus of claim 1, further comprising signal processing circuitry configured to provide the first plurality of optical signals at the first symbol rate and the second plurality of optical signals at the second symbol rate.

7. The apparatus of claim 6, wherein the signal processing circuitry comprises a digital-to-analog converter that operates at a substantially constant clock sampling rate.

8. The apparatus of claim 1, wherein the data rate is 1000 Gb/s.

9. The apparatus in accordance with claim 1, wherein the data are arranged in Optical Data Units (ODUs) that are compliant with an Optical Transport Network (OTN) standard.

10. A method comprising:

selectively generating one of a first plurality of optical signals and a second plurality of optical signals with an optical circuit including a plurality of lasers, the first plurality of optical signals constituting a first wavelength division multiplex (WDM) optical signal and the second plurality of optical signals constituting a second WDM optical signal, said first and second pluralities of optical signals not being generated simultaneously, said first plurality of optical signals being modulated in accordance with a first modulation format and the second plurality of optical signals being modulated in accordance with a second modulation format, the first and second modulation formats being different from one another, and a number of the first plurality of optical signals being equal to a number of the second plurality of optical signals, each of the first plurality of optical signals having a first symbol rate, such that the first plurality of optical signals carry a plurality of first symbols, each of the plurality of first symbols representing a first plurality of bits, and each of the second plurality of optical signals having a second symbol rate different than the first symbol rate, such that the second plurality of optical signals carry a plurality of second symbols, each of the plurality of second symbols representing a second plurality of bits, wherein the collective data rate of the first plurality of optical signals is the same as the collective data rate of the second plurality of optical signals, each of the first plurality of optical signals having a respective one of a first plurality of wavelengths and each of the second plurality of optical signals having a respective one of a second plurality of wavelengths, such that a lowest one of the first plurality of wavelengths is different than a lowest one of the second plurality of wavelengths, each of adjacent ones of the first plurality of wavelengths being separated from one another by a first spectral spacing and each of adjacent ones of the second plurality of wavelengths being separated from one another by a second spectral spacing different than the first spectral spacing;

receiving the generated one of the first and second pluralities of optical signals;

combining the received one the first and second pluralities of optical signals onto an optical communication path.

11. The method of claim 10, wherein a number of the first plurality of bits is greater than a number of the second plurality of bits.

12. The method of claim 10, wherein the plurality of lasers is provided on a substrate.

* * * * *